(12) United States Patent
Kimura et al.

(10) Patent No.: US 9,361,504 B2
(45) Date of Patent: Jun. 7, 2016

(54) OPTICAL INFORMATION READING DEVICE, OPTICAL INFORMATION READING METHOD, COMPUTER-READABLE PROGRAM AND RECORDING MEDIUM

(71) Applicant: Optoelectronics Co., Ltd., Saitama (JP)

(72) Inventors: Kazuto Kimura, Saitama (JP); Hiroshi Hayakawa, Saitama (JP)

(73) Assignee: Optoelectronics Co., Ltd., Saitama (JP)

( * ) Notice: Subject to any disclaimer, the term of this patent is extended or adjusted under 35 U.S.C. 154(b) by 0 days.

(21) Appl. No.: 13/972,422

(22) Filed: Aug. 21, 2013

(65) Prior Publication Data

US 2014/0084061 A1    Mar. 27, 2014

Related U.S. Application Data

(63) Continuation-in-part of application No. PCT/JP2012/053992, filed on Feb. 20, 2012.

(30) Foreign Application Priority Data

Feb. 21, 2011 (JP) ................................ 2011-035162

(51) Int. Cl.
G06K 19/00 (2006.01)
G06K 7/14 (2006.01)
G06K 5/00 (2006.01)

(52) U.S. Cl.
CPC ............... *G06K 7/1486* (2013.01); *G06K 5/00* (2013.01); *G06K 7/1413* (2013.01)

(58) Field of Classification Search
USPC ........................................................ 235/462
See application file for complete search history.

(56) References Cited

U.S. PATENT DOCUMENTS

| 5,451,761 | A | * | 9/1995 | Kawai et al. ............. 235/462.07 |
| 5,525,784 | A | | 6/1996 | Kawai et al. |
| 5,525,785 | A | | 6/1996 | Kawai et al. |

FOREIGN PATENT DOCUMENTS

| JP | 63-155381 A | 6/1988 |
| JP | 06-036065 A | 2/1994 |
| JP | 10-187874 A | 7/1998 |
| JP | 4555952 B2 | 9/2001 |
| JP | 2005-128626 A | 5/2005 |

OTHER PUBLICATIONS

Japanese Patent Office, "Related International Patent Application No. PCT/JP2012/053992", Mar. 8, 2012, Publisher: PCT, Published in: JP.

* cited by examiner

*Primary Examiner* — Matthew Mikels
(74) *Attorney, Agent, or Firm* — Brundidge & Stanger, P.C.

(57) ABSTRACT

To prevent misreading of barcodes and to allow accurate outputting of bar data even when an element is damaged or blurred, an optical information reading device containing a computation means 23a for adding widths of 6 elements containing a bar and a space that are adjacent within one character to derive respective patterns of 2- through n-element added widths and for converting each of the patterns of 2- through n-element added widths into the module number for one character to obtain the module numbers of the patterns of the 2- through n-element added widths; an extraction means 23b for narrowing down the target characters to extract a candidate character wherein the target character is that each module number of the 2- through n-element widths is an integer with an error equal to or less than 1; and a search means 23d for comparing the extracted candidate character, having the module numbers of the patterns of the 2- through n-element added widths with the expected value character for evaluating the candidate character to search for an expected value character with the strongest correlation to the candidate character.

11 Claims, 17 Drawing Sheets

FIG.7A
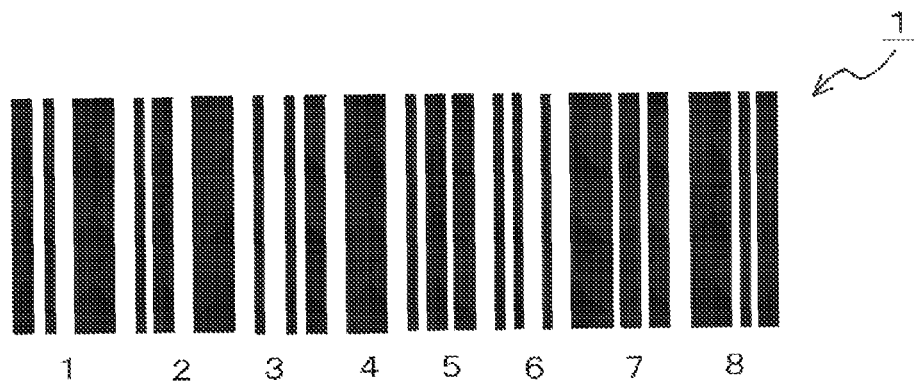
FIG.7B
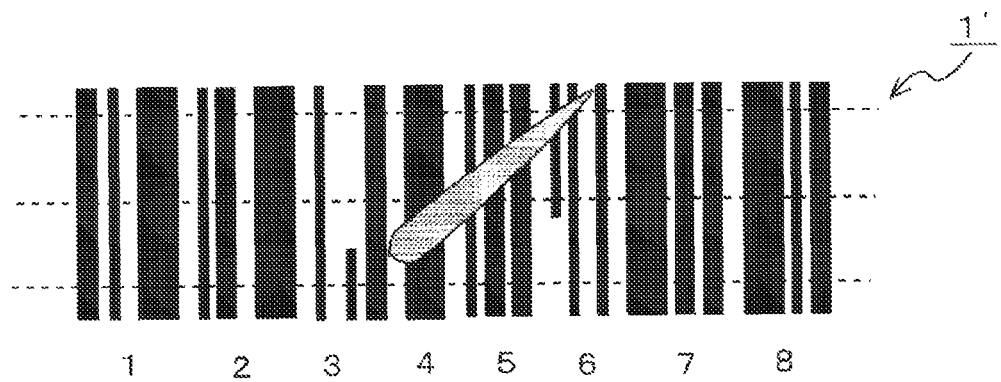
FIG.7C
12??5678
12????78   ⇒ RECONSTRUCTION  1 2 3 4 5 6 7 8
123456??

OPTICAL INFORMATION READING DEVICE, OPTICAL INFORMATION READING METHOD, COMPUTER-READABLE PROGRAM AND RECORDING MEDIUM

FIELD OF THE INVENTION

The present invention relates to an optical information reading device, an optical information reading method, a computer-readable program and a recording medium which are applicable to a barcode symbol reading device that reads a barcode symbol and outputs barcode data.

BACKGROUND OF THE INVENTION

Traditionally, in a goods distribution system, a system is conventionally available wherein a barcode symbol is affixed to or printed on a distribution goods and reading such kind of the barcode symbol by a barcode reader (hereinafter refer to as "an optical information reading device") or the like for processing the information. The optical information reading device reads a barcode symbol 1 to search for its start margin and processes to decode characters following the start margin so as to output barcode data.

By the way, a barcode symbol standard includes CODE 128, CODE 39, EAN/UPC (EAN/Universal Product Code), Interleaved 2 of 5, Coder Bar, RSS, RSS Limited, RSS Expanded and the like. Meanwhile, there are many cases in the barcode symbol that the barcode symbol mark is affixed to or printed directly to the distribution goods. However, it is assumed that the barcode symbol affixed to or printed on the distribution goods is not read correctly due to a printing technology, variability of the pasting technology or a handling method of the distribution goods. Causes of not correctly reading the barcode symbol are a lack, a scratch, etc. of bar or space that forms the barcode symbol.

Regarding such optical information reading device, Patent Document 1 discloses a barcode symbol reading device, a start margin candidate detecting method thereof and a barcode symbol reading method. A decode process for obfuscated characters, including such a lack, a scratch or the like occurred unwillingly in bars and spaces forming the barcode symbol, will be explained with reference to FIG. 14 through FIG. 17.

FIG. 14 is a block diagram that shows a configuration example of a conventional optical information reading device 20. The optical information reading device 20 shown in FIG. 14 contains an optical reading unit 2, a clock generation unit 3, m-stage data buffer 5, an x-multiplier 7, a selector unit 6, a comparator 8, a start margin storage unit 9, an interface unit 11, a decode buffer 25, a count data value storage unit 30, a CPU 33 and a counter unit 40 for a barcode data value.

The optical reading unit 2 reads a barcode symbol 1 as a reading target and generates code readout data D2. For example, the optical reading unit 2 emits a light from an optical source, such as a light emitting diode (LED), a laser diode (LD) or the like to the barcode symbol 1, receives its reflected light by a light receiving device, such as a photo diode, a photo transistor or the like to convert it into an electrical signal, performs binarization on the electrical signal and converts it into digital code readout data D2 that indicates a shading of the barcode symbol 1, namely, a bar of a black portion and a space of a white portion.

The optical reading unit 2 is connected to the counter unit 40. The clock generation unit 3 is connected to the counter unit 40. The clock generation unit 3 generates a sampling clock signal (hereinafter, merely referred to as "CLK signal") having a predetermined frequency and applies the CLK signal to the counter unit 40. The clock generation unit 3 uses an oscillator.

The counter unit 40 for the barcode data value receives the code readout data D2 from the optical reading unit 2 and the CLK signal from the clock generation unit 3, counts the code readout data D2 on the basis of the CLK signal and converts the code readout data D2 into count data D4 (barcode data value: numerical value) representative of widths of elements containing the space as the white portion and the bar as the black portion.

The counter unit 40 is connected to the m-stage data buffer 5, the x-multiplier 7 and the counted data value storage unit 30. The m-stage data buffer 5 temporarily stores the m-stage volume (m is an arbitrary integer) of the count data D4 from the counter unit 40. The m-stage is optionally set in accordance with a print condition of the barcode symbol 1. The m-stage data buffer 5 is configured by a storage circuit such as a flip-flop circuit, a memory or the like.

Since "x" representative of a scale factor with respect to the count data D4 is predetermined when searching the count data D4 for the start margin, the x-multiplier 7 computes the x-multiplication to output the x-multiplication data D7. The x-multiplier 7 is configured by an arithmetic circuit for multiplying the count data D4 by x. The CPU 33 sets the multiplication of the count data D4 in the x-multiplier 7 in accordance with the print condition of the barcode symbol 1.

The m-stage buffer 5 is connected to the selector unit 6. The selector unit 6 selects the data of the comparison target from the count data D4 of the m stages stored temporarily in the m-stage data buffer 5. The selector unit 6 is under control of the CPU 33 or the like so as to select the count data D4 to be compared from the m-stage count data D4.

The CPU 33 sets the selector unit 6 so as to select a stage (k-stage) of the m-stage data buffer 5, wherein the count data D4 prior to that stage is the comparison target, in accordance with a print condition, a print work-up, a smear based on external factors, etc. In this example, a smart margin candidate is previously set in accordance with a fact how many times the count data D4 from the m-stage buffer 5 is larger than the a value of the count data D4 from the counter unit 40.

The comparator 8 is connected to the selector unit 6 and the x-multiplier 7. The selector 8 compares each count data D4 prior to the k-th stage in the m-stage data buffer 5 with the x-multiplied data D7 from the x-multiplier 7. As a result, when the x-multiplied data D7 from the x-multiplier 7 is smaller, it is determined that the start margin candidate exists and a start margin candidate search flag (hereinafter, referred to as "SMF data D8") is generated. The SMF data D8 is applied to the start margin storage unit 9.

The comparator 8 is connected to the start margin storage unit 9. The start margin storage unit 9 is configured to have a storage function, such as a flip-flop circuit. The start margin storage unit 9 stores correspondingly the SMF data D8 from the comparator 8 and the counted data value=the barcode data value D30 as the comparison target at that time. This is because it can be understood which count data D4 is the start margin candidate. The start margin candidate is generated when a white bar having width of a certain degree or more exists prior to a bar of the barcode symbol 1.

The counted data value storage unit 30 stores in chronological order all the count data D4 sequentially output from the counter unit 40. The counted data value storage unit 30 is configured by a storage circuit such as a flip-flop circuit, a DRAM or the like. An interface unit 11 is connected to the start margin storage unit 9 and the counted data value storage unit 30.

The interface unit 11 supplies the SMF data D9 read out from the start margin storage unit 9 and the barcode data value D30 of each character read out from the counted data value storage unit 30 to the CPU 33. The decode buffer 25 is connected to the interface unit 11 and stores the barcode data D12 from the CPU 33.

The decode buffer 25 stores the interim computation data of barcode data value D30 of each character from the counted data value storage unit 30, too. An output terminal OUT is connected to the interface unit 11 and the barcode data D12 after the decode process is applied to the output terminal OUT. For example, the barcode data D12 is read out from the decode buffer 25 through the interface unit 11 to the output terminal OUT.

FIG. 15 shows a computation example according to conventional 2-element added data. The CLK signal shown in FIG. 15 is applied to the counter unit 40 from the clock generation unit 3 shown in FIG. 14. The barcode symbol 1 shown in FIG. 15 is based on, for example, CODE 128 Standard. According to the CODE 128 Standard, one character shown in FIG. 15 consists of three black portion bars (1), (3) and (5) and three white portion spaces (2), (4) and (6). The total width of one character comprises eleven modules. In this character C1, the black portion bar (1) consists of four modules, and the bars (3) and (5) consist of one module respectively. The white portion space (2) consists of one module and the spaces (4) and (6) consist of two modules respectively.

The barcode data value D30 shown in FIG. 15 is derived by sampling the code readout data D2 from the optical reading unit 2 shown in FIG. 14 on the basis of the CLK signal from the clock generation unit 3, counting the code readout data D2 on the basis of the CLK signal and converting the code readout data D2 into the count data D4 that represents the widths of the elements containing the white portion space and the black portion bar.

W11 shown in FIG. 15 is the width of the black portion bar (1) of the character C1. W12 is the width of the space (2) following the bar (1). W13 is the width of the bar (3) following the space (2) of the character C1. W14 is the width of the space (4) following the bar (3) of the character C1. W15 is the width of the bar (5) following the space (4). W16 is the width of the space (6) following the bar (5) of the character C1. The data representative of the widths of the above described six kinds forms the barcode data value D30 of one character.

W21 shown in FIG. 15 is the width in which the bar (1) and the space (2) of the character C1 added by the CPU 33 (hereinafter referred to as "the bar (1)+the space (2)"). The counted data value representative of the added width of the bar (1)+ space (2) constitutes the width W21 data. W22 is the width in which the space (2) and the bar (3) following the bar (1) of the character C1 are added by the CPU 33. The counted data value representative of the added width of the space (2)+the bar (3) forms the width W22 data.

W23 is the width in which the bar (3) and the space (4) following the space (2) of the character C1 are added by the CPU 33. The counted data value indicating the added width of the bar (3)+the space (4) constitutes the width W23 data. W24 is the width in which the space (4) and the bar (5) following the bar (3) of the character C are added by the CPU 33. The counted data value indicating the added width of the space (4)+the bar (5) constitutes the width W24 data. W25 is the width in which the bar (5) and the space (6) following the space (4) of the character C1 are added by the CPU 33. The counted data value indicating the added width of the bar (5)+the space (6) constitutes the width W25 data. The above described five kinds of the width W21 data through the width W25 data are 2-element added type data and they form the barcode data value D30.

FIG. 16 and FIG. 17 are flow charts indicating decode examples (first and second) of the obfuscated character according to the conventional example. The following explanation is under such a condition that the optical information reading device 20 reads the barcode symbol 1 based on the CODE 128 Standard to search for its start margin and further processes the decode of the character following the start margin with the 2-element adding method to output the barcode data D12. In this case, a tolerance (maximum error range) of each element of the bar and the space in the barcode symbol 1 is set to, for example, .+−.0.5 module.

Under these recoding condition, the CPU 33 searches for the start margin in a step ST81 of the flow chart shown in FIG. 16. At this moment, the optical reading unit 2 reads the barcode symbol 1 to generate the code readout data D2. The code readout data D2 is applied from the optical reading unit 2 to the counter unit 40. The clock generation unit 3 applies the sampling CLK signal of a predetermined frequency to the counter unit 40.

The counter unit 40 receives the code readout data D2 from the optical reading unit 2 and the CLK signal from the clock generation unit 3 and counts the code readout data D2 on the basis of the CLK signal. The code readout data D2 is converted into the count data D4 that indicates the 2-element added width of the elements containing the white portion space and the black portion bar. The count data D4 is a numerical value data train that indicates the width of each bar (black portion) and the width of the space (white portion) in the barcode symbol 1. The count data D4 is stored in the counted data value storage unit 30.

The m-stage data buffer 5 stores temporarily the m-stage volume (m is an arbitrary integer) of the count data D4 from the counter unit 40. The m-stage is optionally set in accordance with the print condition of the barcode symbol 1. When searching for the start margin from the count data D4, "x" indicating a multiplying factor for the count data D4 is previously set and the x-multiplier 7 performs the x-multiplying calculation to output the x-multiplied data D7.

The selector unit 6 receives the selection control of the CPU 33 and selects the comparison target data from the m-stage amount of the count data D4 temporarily stored in the m-stage data buffer 5. The comparator 8 compares each of the items of the count data D4 prior to the k-th stage of the m-stage data buffer 5 with the x-multiplied data D7 from the x-multiplier 7.

When the comparison result shows that the x-multiplied data D7 from the x-multiplier 7 is smaller, it is determined that the start margin candidate exists and the start margin candidate search flag (hereinafter referred to as "SMF data D8") is generated. The SMF data D8 is applied to the start margin storage unit 9. The start margin storage unit 9 stores correspondingly the SMF data D8 from the comparator 8 and the counted data value=D10 as the comparison target at that time.

In a step ST82, the CPU 33 extracts the width data of one character (6 elements). According to the character C1 shown in FIG. 15, the counter unit 40 counts the width W11 of the black portion bar (1) and its counted data value becomes the width W11 data. The counter unit 40 counts the width W12 of the white portion space (2) following the bar (1) too and its counted data value becomes the width W12 data. The counter unit 40 counts the width W13 of the bar (3) following the space (2) and its counted data value becomes the width W13 data.

The counter unit 40 counts the width W14 of the space (4) following the bar (3) too and the counted data value becomes the width W14 data. The counter unit 40 counts the width W15 of the bar (5) following the space (4) and the counted data value becomes the width W15 data. The counter unit 40 counts the width W16 of the space (6) following the bar (5) too and the counted data value becomes the width W16 data. The above described six kinds of the width W11 data through the width W16 data constitute the barcode data value D30. The barcode data value D30 is applied through the interface unit 11 to the CPU 33.

The CPU 33 computes one module width of the character C1 in a step ST83. In this example, the CPU 33 converts the barcode data value D30 of the width W11 data through the width W16 data for six elements of one character into the module number of the character to obtain the module number of the 2-element added pattern. As shown in FIG. 15, the five kinds of the width W21 data through the width W25 data are sequentially output to the CPU 33 from the counted data value of the counter unit 40.

For example, the CPU 33 receives the width W21 data and obtains the module number of the added width W21 for the sum of the bar (1) and the space (2) of the character C1. The module number is a ratio of the added width W21 to the whole character width=11 modules, and, for example, 2.4 is computed. In this case, the module number of the added width W21 is modified to the nearest integer by rounding off the module number so that the maximum error of each element, such as the bar and the space is within 0.5. For example, when the module number of the W21 is 2.4, the module number of the W21 is modified to "2". When the module number is 2.6, the module number of the W21 is modified to "3".

In a step ST84, the CPU 33 converts the barcode data value D30 of one character into the 2-element added pattern. For example, the CPU 33 adds the bar (1) and the space (2) of the character C1 shown in FIG. 15 to obtain the counted data value indicating the added width W21 and this counted data value becomes the width 21 data. The CPU 33 adds the space (2) and the bar (3) following the bar (1) of the character C1 to obtain the counted data value indicating the added width W22 and this counted data value becomes the width W22 data.

The CPU 33 adds the bar (3) and the space (4) following the space (2) of the character C1 to obtain the counted data value indicating the added width W23 and this counted data value becomes the width W23 data. The CPU 33 adds the space (4) and the bar (5) following the bar (3) of the character C1 to obtain the counted data value indicating the added width W24 and this counted data value becomes the width W24 data. The CPU 33 adds the bar (5) and the space (6) following the space (4) of the character C1 to obtain the counted data value indicating the added width W25 and this counted data value becomes the width W25 data.

After that, in a step ST85, the CPU 33 searches for a character that is coincident with the previously converted 2-element added pattern. In this example, the CPU 33 searches for a character wherein the previously converted module value matches a theoretical value of an expected value character in the five kinds of the width W21 data through the width W25 data (2-element added data) in accordance with the barcode data value D30 from the counter unit 40 shown in FIG. 14. In the conventional method, the character is determined at this stage.

In a step ST86, the CPU 33 branches the control process in accordance with a fact if the matched character exists or not.

If the matched character exists, the character matched to the 2-element added pattern is a decoded result in a step ST87. Thereafter, the process proceeds to a step ST88 shown in FIG. 17.

With regard to the character assigned to the decoded result in the step ST87, the CPU 33 branches the control process in accordance with a fact if the character is just after the margin or not in the step ST88. If the character regarded as the decoded result is not the character just after the margin, the process proceeds to a step ST89 wherein the CPU 33 branches the control process in accordance with a fact if the decoded result is a stop character or not.

If the decoded result is not the stop character, the process proceeds to a step ST90 wherein the CPU 33 performs an error detection (parity check) and branches the control process in accordance with a fact if the check digit is correct or not. When the check digit is correct, the CPU 33 completes the readout operation in a step ST91 wherein the barcode data D21 of the decode buffer 25 is outputted and the decode buffer 25 is cleared (normal finish). Thereafter, the process proceeds to a step ST95.

In addition, if the character is just after the margin in the step ST88, the process proceeds to a step ST92 wherein the CPU 33 branches the control process in accordance with a fact if the decoded result is the start character or not. If the decoded result is the stop character in the above described step 89 or the decoded result is the start character in the step ST92, the process proceeds to the step 83 shown in FIG. 16. In the step ST83, the CPU 33 performs the decode process of the next character (barcode data value D30 posterior by six elements). Then, the process returns to the step ST81.

If the coincident character does not exist in the step ST86 shown in FIG. 16, the decoded result is not the start character in the step ST92 shown in FIG. 17 or the check digit is wrong in the step ST90, the process proceeds to a step ST94 wherein the CPU 33 performs the reading error process.

After that, the process proceeds to the step ST95 wherein the CPU 33 determines if the process finishes or not. For example, if a reading end command to the optical information reading device 20 is detected and the reading end command is detected, the reading control for the barcode symbol 1 ends. If the reading end command is not detected, the process returns to the step ST81 and the above described operation will be repeated in order to continue the reading control of the barcode symbol 1.

PRIOR ART DOCUMENTS

Patent Documents

Patent Document 1: Japanese Patent No. 4,555,952 (Page 4, FIG. 1)

SUMMARY OF THE INVENTION

By the way, according to the conventional type optical information reading device 20, there are the following problems in the configuration of the optical information reading device that can decode the obfuscated characters by applying the 2-element adding method for one character to the barcode symbol reading device disclosed in the Patent Document 1.

i) In the conventional type optical information reading device 20, the error tolerance of each element containing the bar and the space is set within .+-.0.5 when computing the character pattern, the barcode data value D30 of the width W11 data through the width W16 data of six elements in one character is converted into the module number of the character and the module number of the 2-element adding pattern is derived. Moreover, the module number of the 2-element adding pattern is rounded to the nearest integer with the maximum error within 0.5 for each element, such as the bar, the space, etc.

Thus, in a case that the counted value of the module number for the added width W21 of the character is 2.4, the module number is rounded to the nearest integer and the module number is modified to "2" (refer to the step ST83) although an original candidate of the integer is "2" and "3".

By the way, if the counted value of the module number becomes 2.4 because there are lack, scratch, etc. based on the printing technology, the pasting technology, etc. on the bar and the space constituting the bar code symbol in a case that the module number for the expected value character is "3", there is a problem that an error of .+−.1.0 occurs and the barcode symbol cannot read correctly. When the element having the error of over .+−.0.5 module exists, the readout error occurs (refer to the step ST94).

ii) In addition, although the character coincident with the five kinds of the width W21 data through the width W25 data (2-element added data) is searched for in the character pattern search, the character containing the element having the error over .+−.0.5 module is excluded from the search target. Therefore, there is a possibility that the decoded result is the characters containing the character having the error based on the rounding in the step ST83. As a result thereof, according to the conventional type barcode reading method, when the elements of the bars, the spaces, etc. are damaged or scratched, there is a problem that the barcode is misread and it is difficult to output the barcode data correctly.

In order to resolve the above described problems, an optical information reading device according to Claim 1 is characterized to comprise a computation means for adding widths of 2 elements through n elements, the 2 elements containing a bar and a space that are adjacent within one character, wherein n is greater than 2, the n greater than 2 elements containing two or more bars and one or more spaces and one or more bars and two or more spaces that are adjacent within one character to derive respective 2- through n-element added widths and for converting each of the 2- through n-element added widths into the module number for one character to derive an actual measurement value of the module numbers of the 2- through n-element added widths; an extraction means for narrowing down target characters wherein each of errors between the actual measurement value and an ideal value of the module number for all the 1-element and the 2- through n-element added widths derived by said computation means is equal to or less than 1, to extract candidate characters; and searching the one candidate character having the minimum of the summed errors as the readout decode result.

According to the optical information reading device of Claim 1, when reading the barcode symbol and outputting the decoded result, the computation means adds widths of n elements (n.gtoreq.2) containing the adjacent bars and spaces in one character to obtain the 2- through n-element added widths and converts each of the 2- through n-element added widths into the module numbers with respect to one character to obtain the module numbers of the 2- through n-element added widths. The extraction means extracts as the candidate character the character wherein each module number of the 2- through n-element added widths obtained by the computation means is the integer with the error equal to or less than 1. On the premise of the above, the search means compares the candidate character, having the module numbers of the 2- through n-element added widths extracted by the extraction means, with the expected value character for evaluating the candidate character to search for the expected value character having the strongest correlation to the candidate character.

According to the search, the barcode data of the expected value character, having the strongest correlation to the candidate character extracted from the plural candidate characters, can be outputted as the decoded result for the readout barcode symbol so that the misreading of the barcode can be avoided significantly in comparison to the conventional barcode reading method.

BRIEF DESCRIPTION OF THE DRAWINGS

FIG. 7A is a diagram explaining a barcode symbol example of CODE 128, a lack example and a reconstruction example.

FIG. 7B is a diagram explaining a barcode symbol example of CODE 128, a lack example and a reconstruction example.

FIG. 7C is a diagram explaining a barcode symbol example of CODE 128, a lack example and a reconstruction example.

DETAILED DESCRIPTION

An object of the present invention is to provide an optical information reading device, an optical information reading method, a computer readable program and a recoding medium that prevent the barcode misreading by comparison to the conventional barcode reading method and output the accurate barcode data even if the element is damaged or blurred.

Figure 1:
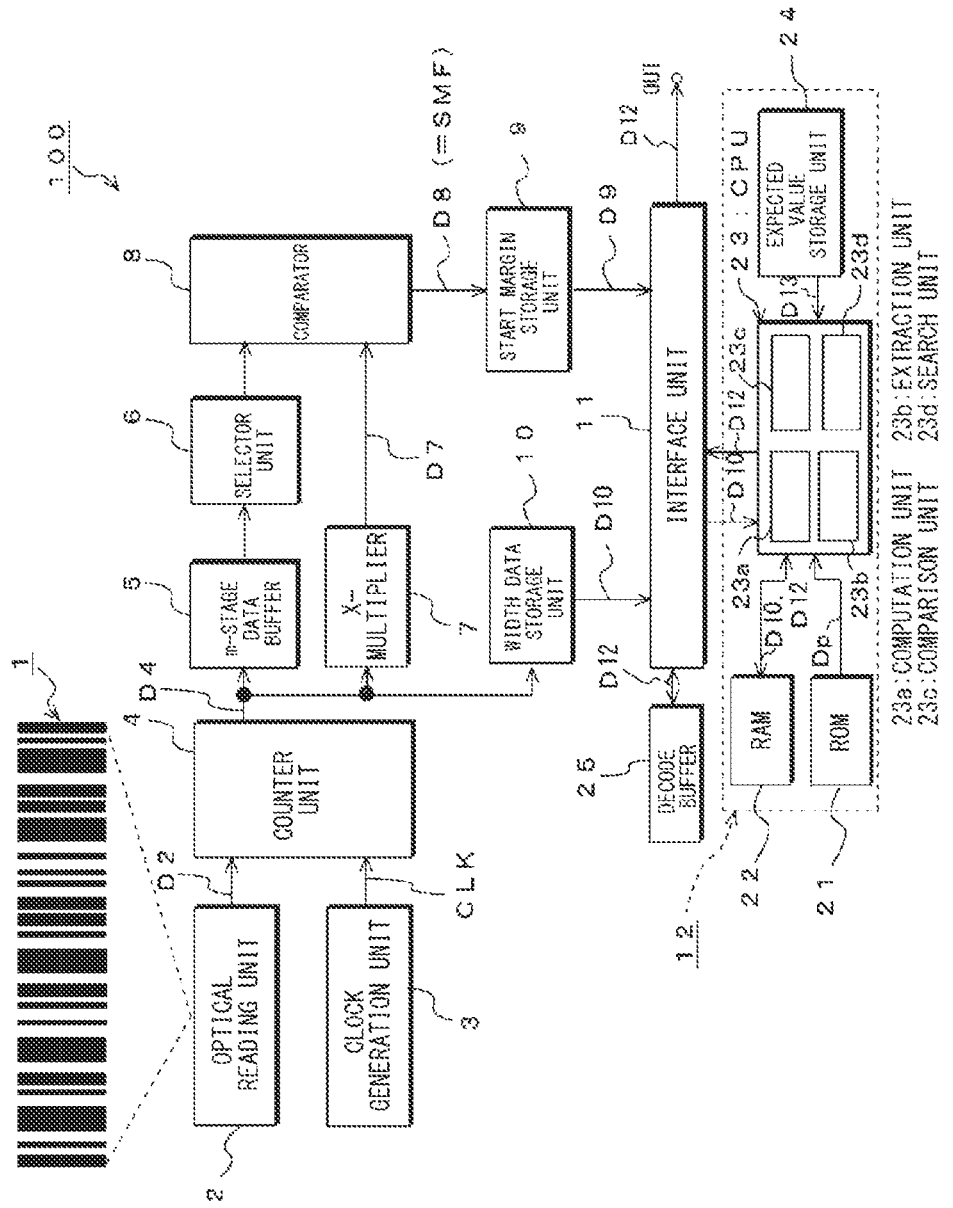
FIG. 1 is a block diagram of a configuration example of a barcode symbol reading device 100 according to an embodiment of the present invention.

The optical information reading device, the optical information reading method, the computer readable program and the recoding medium according to the present invention will be described by reference to the drawings. A barcode symbol reading device 100 shown in FIG. 1 is an configuration example of the optical information reading device, reads the barcode symbol 1 to search for a start margin thereof and further processes a decode of a character following the start margin to output barcode data D12.

The barcode symbol reading device 100 comprises an optical reading unit 2, a clock generation unit 3, a counter unit 4, a m-stage data buffer 5, a x-multiplier 7, a selector unit 6, a comparator 8, a start margin storage unit 9, a width data storage unit 10, an interface unit 11, a microprocessor 12 and a decode buffer 25. The blocks of the same name and the same reference symbol as those of the prior example have the same functions and their explanation will not be described.

The counter unit 4 receives the code readout data D2 from the optical reading unit 2 and the CLK signal from the clock generation unit 3. The counter unit 4 counts the code readout data D2 on the basis of the CLK signal, and converts the code readout data D2 into the count data D4 (barcode data value: numerical value) indicating the 1-element width and the n-element added width of the elements containing the white portion space and the black portion bar.

The counter unit 4 is connected to the width data storage unit 10. The width data storage unit 10 stores and holds in time sequence all the items of the whole count data D4 regarding the target character of the 1-element width and the n-element added width outputted sequentially from the counter unit 4. The width data storage unit 10 is composed of the storage circuit such as the flip-flop circuit, DRAM or the like. The width data storage unit 10 outputs the count data D4 regarding the target character of the 1-element width and the n-element added width as the width data D10 of each character (corresponding to the barcode data value D30). The interface unit 11 is connected to the start margin storage unit 9 and the width data storage unit 10.

The microprocessor 12 performs the recognition process of the barcode in response to the SMF data D9 and the width data D10 of each character applied through the interface unit 11. The microprocessor 12 contains a read only memory (hereinafter, referred to as ROM 21) for the program storage, a random access memory (hereinafter, referred to as RAM 22) for the work memory, a central processing unit (hereinafter, referred to as CPU 23) and an expected value storage unit 24.

The ROM 21 constitutes an example of the recording medium. The ROM 21 stores the computer readable program that is the program data Dp as a combination of commands for executing the optical information reading method according to the present invention. Its contents are the program wherein the barcode symbol reading device 100 performs steps of adding n element widths (n.gtoreq.2) containing adjacent bar and space in one character to obtain respective 2- through n-element added widths; converting each of the obtained 2- through n-element added widths into a module number with respect to one character to obtain the module number of the 2- through n-element added widths; extracting a candidate character by narrowing down the target characters wherein each module number of the obtained 2- through n-element added widths with an error equal to or less than 1; and comparing the extracted candidate character having the module number of the 2- through n-element added widths with an expected value character for evaluating the candidate character to search for an expected value character having the strongest correlation to the candidate character. The candidate character is a character narrowed down from the target characters. The program data Dp includes a system program data for booting the system.

The RAM 22 temporarily stores not only the system program for controlling the barcode symbol reading device 100 but also control information for controlling a computation of executing the optical information reading method, an extraction, a search, a comparison and the like. For example, when a power is turned on, the CPU 23 detects the power-on information, reads the system program from the ROM 21 to develop it to the RAM 22, boots the system and controls the whole operation of the barcode symbol reading device 100.

In this example, the CPU 23 acts at least four functions of a computation unit 23a, an extraction unit 23b, a comparison unit 23d, a search unit 23d, etc. The computation unit 23a constitutes one example of the computation means, receives the width data D10 of each target character and adds the widths of n elements (n.gtoreq.2) including the adjacent bar and space of one character on the basis of the width data D10 to obtain each of the 2- through n-element added widths. The computation unit 23a converts each of the obtained 2- through n-element added widths into the module number with respect to one character and obtains the module numbers of the 2- through n-element added widths.

The extraction unit 23b extracts the candidate character by narrowing down the target characters having each of the module numbers with the error equal to or less than 1, wherein the module numbers are the 2- through n-element added widths (hereinafter, also referred to as 2- through n-element added pattern) obtained by the computation unit 23a. When detecting the 2- through n-element added patterns, the extraction unit 23b extracts the n-element width data D10 for one character and the width data D10 of one or more anteroposterior elements of the target character.

In this example, the extraction criteria is expanded from an integer with an error less than 05 in a conventional system to an integer with an error equal to or less than 1. Under this condition, the width data D10 of n elements for one character and the width data D10 of at least one anteroposterior element in the target character are extracted. Therefore, the number of the target characters can be more extracted than those of the conventional method wherein the module number of each of the 2-through n-element added widths is the integer with the error equal to or less than 1. Moreover, since there is a high possibility such that the decoded result is not based on only the first strongest correlation but also the second, third, . . . stronger correlations, a plurality of candidate characters can be outputted as the decoded result. Therefore, the barcode misreading can be significantly prevented by comparison to the conventional barcode reading method.

The comparison unit 23c compares the candidate character having the module numbers of the 2-through n-element added widths each extracted by the extraction unit 23b with the expected value character (theoretical value) for evaluating the candidate character. The comparison unit 23c has a determination function, compares the sum value of the added values of the n elements (n.gtoreq.2) including the adjacent bars and spaces in one character with the whole width value indicating the whole width of one character, and determines whether the width data D10 for one character is proper or not in response to a comparison result thereof.

According to this determination, the disappearance, division and like of the character bar can be determined. In addition, it is possible to combine the decoded results of the plural scans so that it is possible to read the barcode with heavy contamination and burring. The target characters can be narrowed down in accordance with the determination of the disappearance, division and like of the bars so that the computational complexity can be reduced and the high speed process can be accomplished.

The search unit 23d searches for the expected value character having the strongest correlation to the candidate character. For example, when the computation unit 23a computes the error between the actual value of the module number of the candidate character and the ideal value of the module number of the expected value character, the search unit 23d searches for the expected value character having the strongest correlation to the candidate character having the minimum error value obtained by summing the errors computed by the computation unit 23a. In this example, since the expected value character having the strongest correlation to the candidate character with the minimum error value is searched, the misreading of the barcode can be prevented significantly by comparison to the conventional barcode reading method.

The microprocessor 12 is connected to the expected value storage unit 24. The expected value storage unit 24 stores the expected value character (theoretical value). The expected value character is the module number (theoretical value) that forms each element of the character of the CODE 128 Standard. They constitute the barcode symbol reading device 100. The computation unit 23a, the extraction unit 23b, the comparison unit 23c and the search unit 23d in the CPU 23 may be accomplished by software or hardware.

Embodiment 1

Then, a computation example of 1-element data, 2- through 6-element added data according to the first embodiment will be explained by reference to FIG. 2. In this example, the barcode symbol 1 of the CODE 128 Standard will be explained. According to the CODE 128 Standard, one character is composed of three black portion bars (1), (3), (5) and three white portion spaces (2), (4), (6). In the drawing, C1 indicates the character, C0 indicates the character before the target character C1 by one character and C2 indicates the character after the target character by one character.

The whole width of one character is composed of eleven modules. In this example, the black portion bar (1) contains four modules, each of the bar (3) and the bar (5) contains one module, the white portion space (2) contains one module and each of the spaces (4) and (6) contains two modules.

There are three kinds of the start codes and each start code indicates 103 kinds of code patterns. In the CODE 128 Standard, it can be represented by ASCII 128 characters. By using the start code C, one character can be represented by two digit numerals and a very high print density can be accomplished. The barcode symbol 1 of the CODE 128 is composed of eight characters (see FIG. 5). The sum of the module number for the bar uses even number parity and the sum of the module number for the space uses an odd number parity. By using the even number parity and the odd number parity, the self-correction function is accomplished.

Figure 2:
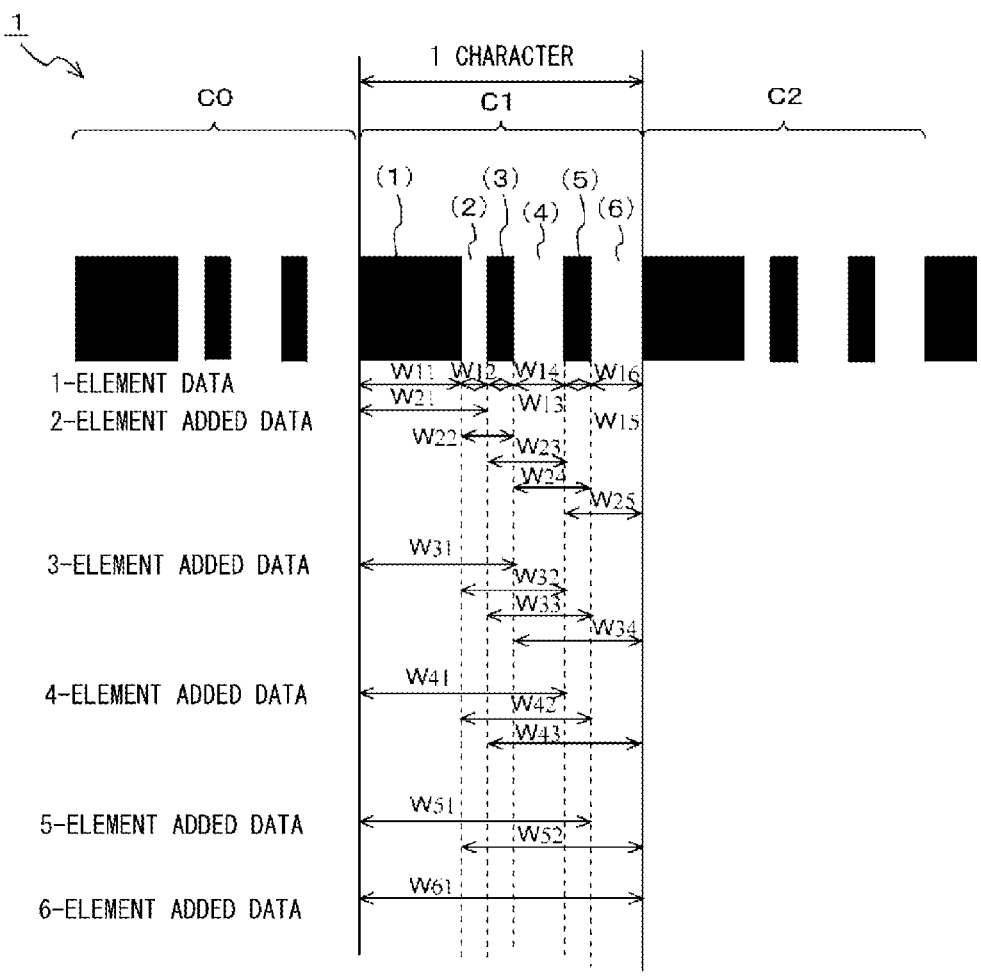
FIG. 2 is a diagram explaining a computation example of 1-element data and 2- through 6-element added data according to a first embodiment.

W11 indicated in FIG. 2 is the width of the black portion of bar (1) of the target character C1. The width of the bar (1) is counted by the counter unit 4 and the counted data value forms the width W11 data. W12 is the width of the space (2) following the bar (1). The width of the space (2) is also counted by the counter unit 4 and the counted data value forms the width W12 data. W13 is the width of the bar (3) following the space (2) of the target character C1. The width of the bar (3) is counted by the counter unit 4 and its counted data value forms the width W13 data.

W14 is the width of the space (4) following the bar (3) of the target character C1. The width of the space (4) is counted by the counter unit 4 too and the counted data value forms the width W14 data. W15 is the width of the bar (5) following the space (4). The width of the bar (5) is counted by the counter unit 4 and the counted data value forms the width W15 data. W16 is the width of the space (6) following the bar (5) of the character C1. The width of the space (6) is counted by the counter unit 4 and the counted value data forms the width W16 data. The above-described six kinds of the width W11 data through the width W16 data are 1-element data of one character and they form the width data D10.

W21 shown in FIG. 2 is the width which is that the bar (1) and the space (2) of the target character C1 are added by the computation unit 23a (hereinafter referred to as the bar (1)+ the space (2)). The counted data value indicating the added width of the bar (1) and the space (2) forms the width W21 data. W22 is the width in which the space (2) and the bar (3) following the bar (1) of the target character C1 are added by the computation unit 23a. The counted data value indicating the added width of the space (2)+the bar (3) forms the width W22 data.

W23 is the width in which the bar (3) and the space (4) following the space (2) of the target character C1 are added by the computation unit 23a. The counted data value indicating the added width of the bar (3)+the space (4) forms the width W23 data. W24 is the width in which the space (4) and the bar (5) following the bar (3) of the target character C1 are added by the computation unit 23a. The counted data value indicating the added width of the space (4)+the bar (5) forms the width W24 data. W25 is the width in which the space (4)+the bar (5) following the space (4) of the target character C1 are added by the computation unit 23a. The counted data value indicating the added width of the bar (5)+the space (6) forms the width W25 data. The above-described five kinds of the width W21 data through the width W25 data are the 2-element added data of one character and form the width data D10.

W31 shown in FIG. 2 is the width in which the bar (1), the space (2) and the bar (3) of the target character C1 are added by the computation unit 23a. The counted data value indicating the added width of the bar (1)+the space (2)+the bar (3) forms the width W31 data. W32 is the width in which the space (2), the bar (3) and the space (4) following the bar (1) of the target character C1 are added by the computation unit 23a. The counted data value indicating the added width of the space (2)+the bar (3)+the space (4) forms the width W32 data.

W33 is the width in which the bar (3), the space (4) and the bar (5) following the space (2) of the target character C1 are added by the computation unit 23a. The counted data value indicating the added width of the bar (3)+the space (4)+the bar (5) forms the width W33 data. W34 is the width in which the space (4), the bar (5) and the space (6) following the bar (3) of the target character C1 are added by the computation unit 23a. The counted data value indicating the added width of the space (4)+the bar (5)+the space (6) forms the width W34 data. The above-described four kinds of the width W31 data through the width W34 data are the 3-element added data of one character and they form the width data D10.

W41 shown in FIG. 2 is the width in which the bar (1), the space (2), the bar (3) and the space (4) of the target character C1 are added by the computation unit 23a. The counted data value indicating the added width of the bar (1)+the space (2)+the bar (3)+the space (4) forms the width W41 data. W42 is the width in which the space (2), the bar (3), the space (4) and the bar (5) following the bar (1) of the target character C1 are added by the computation unit 23a. The counted data value indicating the added width of the space (2)+the bar (3)+the space (4)+the bar (5) forms the width W42 data.

W43 is the width in which the bar (3), the space (4), the bar (5) and the space (6) following the space (2) of the target character C1 are added by the computation unit 23a. The counted data value indicating the added width of the bar (3)+the space (4)+the bar (5)+the space (6) forms the width W43 data. The above-described three kinds of the width W41 data through the width W43 data are the 4-element added data of one character and they form the width data D10.

W51 shown in FIG. 2 is the width in which the bar (1), the space (2), the bar (3), the space (4) and the bar (5) of the target character C1 are added by the computation unit 23a. The counted data value indicating the added width of the bar (1)+the space (2)+the bar (3)+the space (4)+the bar (5) forms the width W51 data.

W52 is the width in which the space (2), the bar (3), the space (4), the bar (5) and the space (6) following the bar (1) of the target character C1 are added by the computation unit 23a. The counted data value indicating the added width of the space (2)+the bar (3)+the space (4)+the bar (5)+the space (6) forms the width W52 data. The above-described two kinds of the width W51 data and the width W52 data are the 5-element added data of one character and form the width data D10.

W61 shown in FIG. 2 is the width in which the bar (1), the space (2), the bar (3), the space (4), the bar (5) and the space (6) of the target character C1 is added by the computation unit 23a. The counted data value indicating the added width of the bar (1)+the space (2)+the bar (3)+the space (4)+the bar (5)+ the space (6) forms the width W61 data. One kind of the width W61 data is the 6-element added data of one character and forms the width data D10.

21 kinds of target characters are obtained from the counted data values outputted from the counter unit 4 wherein they are six kinds of the width W11 data through the width 16 data (1-element data), five kinds of the width W21 data through the width 25 data (2-element data), four kinds of the width W31 data through the width 34 data (3-element data), three kinds of the width W41 data through the width 43 data (4-element data), two kinds of the width W51 data and the width 52 data (5-element data) and one kind of the width W61 data (6-element data).

Then, in the optical information reading method of the present invention, a decode example of the obfuscation character according to the first embodiment will be explained with reference to FIG. 3 and FIG. 4. This embodiment is an example in which the barcode symbol 1 relating to CODE 128 standard is read, its start margin is searched for, the target character following the start margin is processed for the decoding and the barcode data D12 is outputted. In this case, the error tolerance (the maximum error range) of each element including the bar or the space of the barcode symbol 1 is set to .+−.1.0 module. For the barcode symbol 1, the target character C1 shown in FIG. 2 will be described (character decode algorithm).

Figure 3:
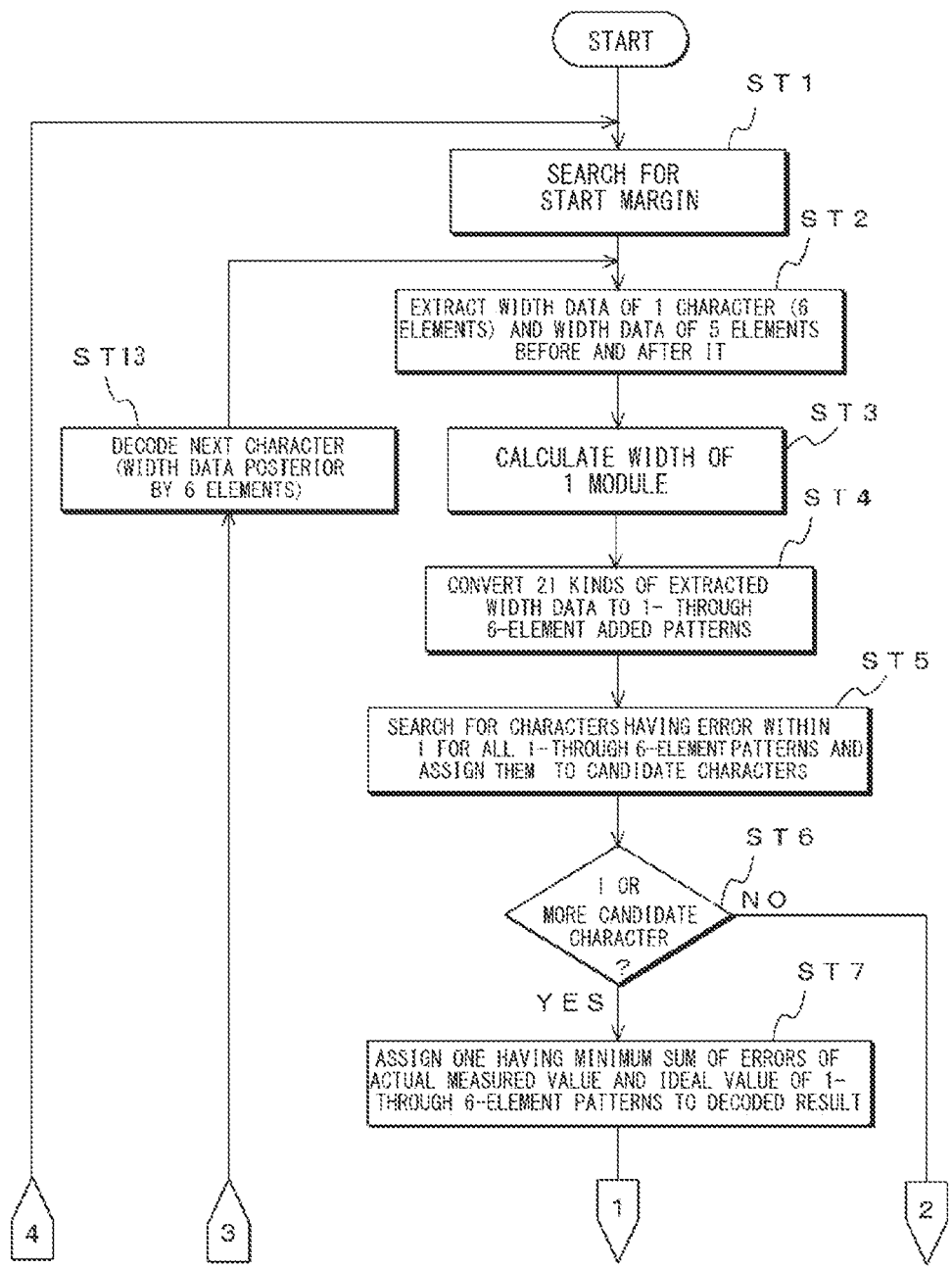
FIG. 3 is a flow chart showing a decode example (part one) of obfuscation character according to the first embodiment.
Figure 4:
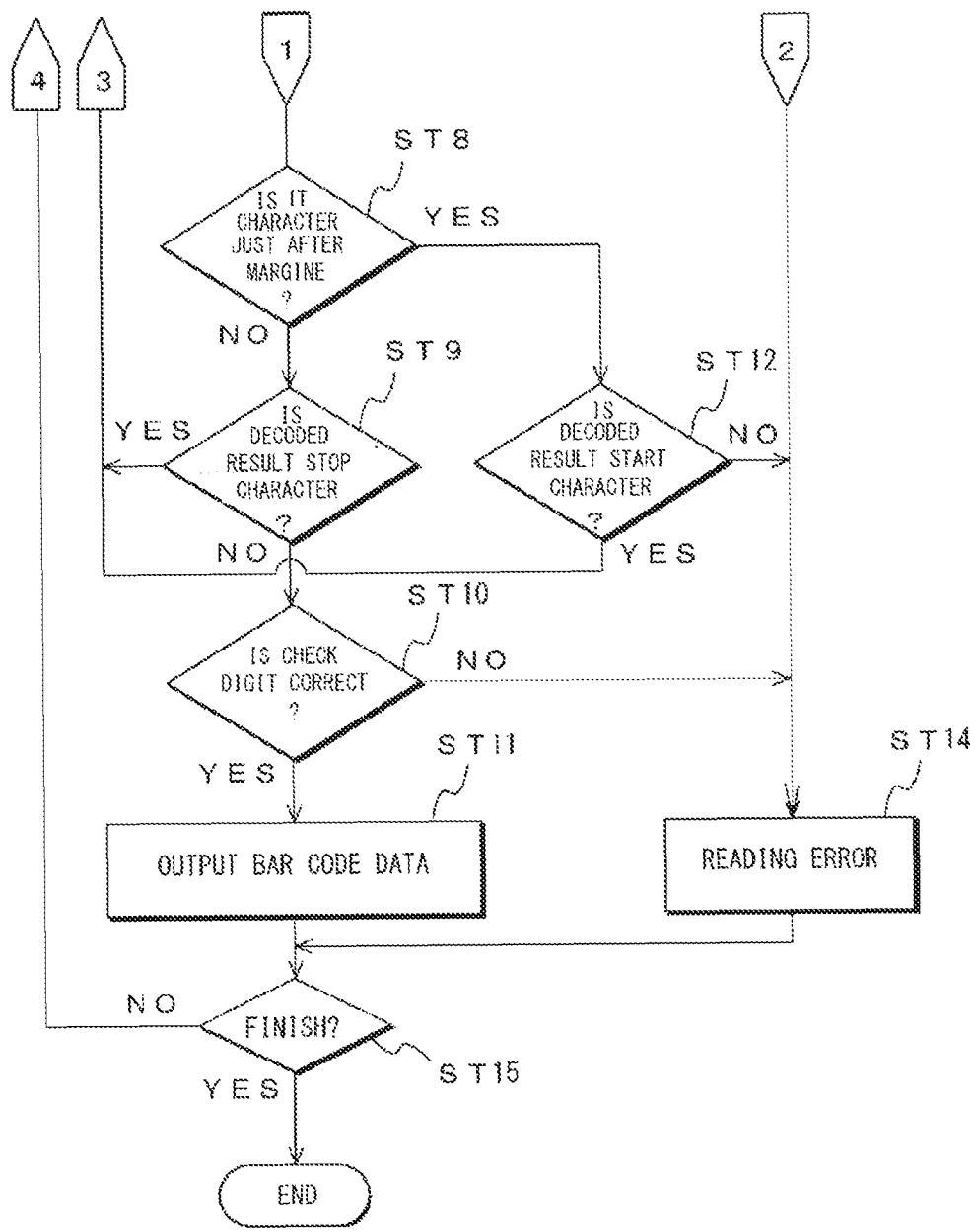
FIG. 4 is a flow chart showing the decode example (part two) of the obfuscation character.

Under these decoding conditions, in a step ST1 of the flow chart shown in FIG. 3, the microprocessor 12 searches for the start margin. In this instance, the optical reading unit 21 reads the barcode symbol 1 and generates the code readout data D2. The code readout data D2 is outputted from the optical reading unit 2 to the counter unit 4. The clock generation unit 3 applies the CLK signal for the sampling of the predetermined frequency to the counter unit 4.

The counter unit 4 receives the code readout data D2 from the optical reading unit 2 and the CLK signal from the clock generation unit 3, counts the code readout data D2 on the basis of the CLK signal, and converts the code readout data D2 into the counted data D4 indicating the 1-element width and the 6-element added width of the elements including the white portion spaces and the black portion bars. The counted data D4 is a numerical value data train indicating each of the widths of the bars (black portions) and the widths of the spaces (white portions). The counted data D4 is stored in the width data storage unit 10.

The m-stage data buffer 5 stores temporarily the m-stage amount of the counted data D4 from the counter unit 4 (m is an arbitrary integer). The m-stage is optionally set in accordance with the print condition of the barcode symbol 1. When searching for the start margin from the counted data D4, "x" indicating a multiplication factor for the counted data D4 is previously set, and the x-multiplier 7 performs the x-multiplication to output the x-multiplied data D7.

The selector unit 6 is under selection control of the microprocessor 12 and selects the data to be compared from the m-stage counted data D4 temporarily stored in the m-stage data buffer 5. The comparator 8 compares each of the items of the counted data D4 selected by the selector unit 6 prior to the k-th stage in the m-stage data buffer 5 with the x-multiplied data D7 outputted from the x-multiplier 7.

When the comparison result shows that the x-multiplied data D7 from the x-multiplier 7 is smaller, it is determined that the start margin candidate exists and a start margin candidate search flag (hereinafter referred to as a SMF data D8) is generated. The SMF data D8 is applied to the start margin storage unit 9. The start margin storage unit 9 stores the SMF data D8 from the comparator 8 and the counted data value=D10 as the comparison target at this time.

In a step ST2, the CPU 23 extracts the width data D10 (six elements) of one character and the width data D10 of each of 5 elements before and after that. In the target character C1 shown in FIG. 2, the width W11 of the black portion bar (1) is counted by the counter unit 4 and its counted data value becomes the width W11 data. The width W12 of the white portion space (2) following the bar (1) is counted by the counter unit 4 and its counted data value becomes the width W12 data. The width W13 of the bar (3) following the space (2) is counted by the counter unit 4 and its counted data value becomes the width W13 data.

The width W14 of the space (4) following the bar (3) is counted by the counter unit 4 and its counted data value becomes the width W14 data. The width W15 of the bar (5) following the space (4) is counted by the counter unit 4 and its counted data value becomes the width W15 data. The width W16 of the space (6) following the bar (5) is counted by the counter unit 4 and its counted data value becomes the width W16 data. The above described six kinds of the width W11 data through the width W16 data constitute the width data D10. The width data D10 is applied through the interface unit 11 to the CPU 23.

The CPU 23 receives the width data D10 of each target character and adds the widths of the n elements (n.gtoreq.2) containing the adjacent bars and spaces in one character on the basis of the width data D10 to obtain respective 2- through n-element added patterns. In this example, n=6. When obtaining each of the 2- through n-element added widths, the width data D10 of the six elements in one character and the width data D10 of the five anteroposterior elements in the target character.

For example, the computation unit 23a adds the bar (1) and space (2) of the target character C1 shown in FIG. 2, and the counted data value indicating the added width W21 becomes the width W21 data. The computation unit 23a adds the space (2) and the bar (3) following the bar (1) of the target character C1, and the counted data value indicating the added width W22 becomes the width W22 data. The computation unit 23a adds the bar (3) and the space (4) following the space (2) of the target character C1, and the counted data value indicating the added width W23 becomes the width W23 data.

The computation unit 23a adds the space (4) and the bar (5) following the bar (3) of the target character C1, and the counted data value indicating the added width W24 becomes the width W24 data. The computation unit 23a adds the bar (5) and the space (6) following the space (4) of the target character C1, and the counted data value indicating the added width W25 becomes the width W25 data. The above-described five kinds of the width W21 data through the width W25 data constitute the width data D10.

The computation unit 23a adds the bar (1), the space (2) and the bar (3) of the target character C1 shown in FIG. 2, and the counted data value indicating the added width W31 becomes the width W31 data. The computation unit 23a adds the space (2), the bar (3) and the space (4) following the bar (1) of the target character C1, and the counted data value indicating the added width W32 becomes the width W32 data.

The computation unit 23a adds the bar (3), the space (4) and the bar (5) following the space (2) of the target character C1, and the counted data value indicating the added width W33 becomes the width W33 data. The computation unit 23a adds the space (4), the bar (5) and the space (6) following the bar (3) of the target character C1, and the counted data value indicating the added width W34 becomes the width W34 data. The above-described four kinds of the width W31 data through the width W34 data form the width data D10.

The computation unit 23a adds the bar (1), the space (2), the bar (3) and the space (4) of the target character C1 shown in FIG. 2, and the counted data value indicating the added width W41 forms the width W41 data. The computation unit 23a adds the space (2), the bar (3), the space (4) and the bar (5) following the bar (1) of the target character C1, and the counted data value indicating the added width W42 becomes the width W42 data.

The computation unit 23a adds the bar (3), the space (4), the bar (5) and the space (6) following the space (2) of the target character C1, and the counted data value indicating the added width W43 becomes the width W43 data. The above-described three kinds of the width W41 data through the width W43 data form the width data D10.

The computation unit 23a adds the bar (1), the space (2), the bar (3), the space (4) and the bar (5) of the target character C1 shown in FIG. 2, and the counted data value indicating the added width W51 forms the width W51 data. The computation unit 23a adds the space (2), the bar (3), the space (4), the bar (5) and the space (6) following the bar (1) of the target character C1, and the counted data value indicating the added width W52 becomes the width W52 data. The above-described two kinds of the width W51 data and the width W52 data form the width data D10.

The computation unit 23a adds the bar (1), the space (2), the bar (3), the space (4), the bar (5) and the space (6) of the target character C1 shown in FIG. 2, and the counted data value indicating the added width W61 becomes the width W61 data. One kind of the width W61 data forms the width data D10.

21 kinds of target characters are obtained from the counted data values outputted from the counter unit 4 wherein they are six kinds of the width W11 data through the width W16 data (1-element data), five kinds of the width W21 data through the width W25 data (2-element added data), four kinds of the width W31 data through the width W34 data (3-element added data), three kinds of the width W41 data through the width W43 data (4-element added data), two kinds of the width W51 data and the width W52 data (5-element added data) and one kind of the width W61 data (6-element added data).

In a step ST3, the CPU 23 computes one module width of the target character C1. In this example, the computation unit 23a converts each of the previously obtained 2- through 6-element added patterns (element widths) into the module number for one character to obtain the module numbers of the 2- through 6-element added patterns. As shown in FIG. 2, from the counted data values outputted from the counter unit 4, six kinds of the width W11 data through the width W16 data, five kinds of the width W21 data through the width W25 data, four kinds of the width W31 data through the width W34 data, three kinds of the width W41 data through the width W43 data, two kinds of the width W51 data and the width W52 data and one kind of the width W61 data are applied to the CPU 23 in sequence.

For example, the computation unit 23a receives the width W21 data and obtains the module number of the added width W21 derived by adding the bar (1) and the space (2) of the target character C1. The module number is a ratio of the added width W21 to the whole character width that is 11 modules, for example, 2.4 are computed. In this case, the module number of the added width W21 is "2" or "3" by extracting the candidate character by narrowing down the target characters wherein the module number of the added width W21 is an integer and the maximum error of each of the elements, such as the bars, the spaces and like is equal to or less than 1.0.

In this example, since the maximum error range of each element is expanded to .+−.1.0 module, the error tolerance of each element can be expanded to 1.0. Since the tolerance is increased, the condition for accepting the matched target characters is relaxed. Therefore, the misreading of the bar-code symbol can be prevented.

In a step ST4, the CPU 23 converts 21 kinds of the extracted width data D10 into the 1-element through 6-element added patterns (element widths). In this example, 6 kinds of the width W11 data through the width W16 data are converted into the 1-element data of one character and the 1-element patter is formed as the recognized pattern of the target character C1 on the basis of the 1-element data. 5 kinds of the width W21 data through the width W25 data are converted into the 2-element added data of one character and the 2-element added pattern (recognized pattern) of the target character C1 is formed on the basis of the 2-element added data. 4 kinds of the width W31 data through the width W34 data are converted into the 3-element added data of one character and the 3-element added pattern of the target character C1 is formed on the basis of the 3-element added data. 3 kinds of the width W41 data through the width W43 data are converted into the 4-element added data of one character and the 4-element added pattern of the target character C1 is formed on the basis of the 4-element added data. 2 kinds of the width W51 data and the width W52 data are converted into the 5-element added data of one character and the 5-element added pattern of the target character C1 is formed on the basis of the 5-element added data. One kind of the width W61 data is converted into the 6-element added data of one character and the 6-element added pattern of the target character C1 is formed on the basis of the 6-element added data.

In a step ST5, in order to narrow down the target characters, the CPU 23 searches for the target characters wherein the errors of the module numbers for all the 1-element pattern and the 2- through 6-element added patterns are within 1 to determine the candidate character. At this time, the extraction unit 23b in the CPU 23 narrows down the target characters wherein the module number for each of the 1-element pattern and the 2- through 6-element added patterns obtained by the computation unit 23a is the integer with the error within 1 and the candidate character is extracted. At this time, the extraction unit 23b extracts the width data D10 of 6 elements for one character of the 1-element pattern and the 2- through 6-element added patterns obtained by the computation unit 23a and the width data D10 of the anteroposterior (6-1) elements of the target character.

In a step ST6, the CPU 23 branches the control in accordance with a fact if one or more candidate characters exist or not. If one or more (plural) target characters exist, in a step ST7, an error between the actual measurement values and its ideal values of the 1- through 6-element added patterns is computed and the candidate character having the minimum of the summed error is assigned to the decoded result. The candidate character having the minimum error value is the character having the strongest correlation to the expected value character. In this example, the target character having the minimum total error is selected as the candidate character.

At this time, in the CPU 23, the expected value character (theoretical value) is read from the expected value storage unit 24 to the comparison unit 23c of the CPU 23. The comparison unit 23b compares the candidate characters having the module number of each the 2- through 6-element added patterns (element widths) extracted by the extraction unit 23b with the expected value character (theoretical value) for evaluating the candidate character. The comparison result is applied to the search unit 23d.

The extraction unit 23d searches for the expected value character having the strongest correlation to the candidate character. For example, the above-described computation unit 23a computes the error between the actual measurement value of the module number of the candidate character and the ideal value of the module number of the expected value character, and the search unit 23d searches for the expected value character having the strongest correlation to the candidate character having the minimum error value obtained by summing the errors computed by the computation unit 23d. In this example, since the expected value character having the strongest correlation to the candidate character with the minimum error value is searched for, the misreading of the barcode can be prevented significantly by comparison to the conventional barcode reading method.

The following operations are the same as those of the conventional system. For example, in a step 8 shown in FIG. 4, the CPU 23 branches the control in accordance with a fact that the decoded result candidate character is the target character just after the margin or not. If the decoded result candidate character is not the target character just after the margin, the process proceeds to a step ST9 where the CPU 23 branches the control in accordance with a fact that the decoded result candidate character is the stop character or not.

If the decoded result candidate character is not the stop character, the process proceeds to a step ST10 where the CPU 23 performs the error detection (parity check) and branches the control in accordance with a fact that the check digit is correct or not. If the check digit is correct, the readout is completed, and in a step ST11, the CPU 23 produces the barcode data D12 of the candidate character as the decoded result.

In the step 8, if the decoded result candidate character is the target character just after the margin, the CPU 23 proceeds to a step ST12 where the CPU 23 branches the control in accordance with a fact that the decoded result candidate character is the start character or not.

If the decoded result candidate character is the stop character in the above described step ST9 or if the decoded result candidate character is the start character in the step ST12, the CPU 23 proceeds to a step ST13 shown in FIG. 3. In the step ST13, the CPU 23 performs the decode process of the next character (data after by six elements). After that, the process returns to the step ST2.

If the decoded result candidate character is not the start character in the step ST12 or if the check digit is wrong in the step ST10, the process proceeds to a step 14 where the CPU 23 performs the reading error process. In the reading error process, the next margin search and the like are accomplished. If the character recognition has the error, an error character may be tentatively positioned to form the barcode data.

After that, the process proceeds to a step ST15 where the CPU 23 determines if the process is finished. For example, a readout finish command for the barcode symbol reading device 100 is detected and if the readout finish command is detected, the readout control for the barcode symbol 1 is finished. If the readout finish command is not detected, in order to continue the readout control of the barcode symbol 1, the process returns to the step ST11 where the above described contents will be repeated.

According to the barcode symbol reading device 100 of the first embodiment, when the barcode symbol 1 is read and its decoded result is outputted, the computation unit 23a adds the widths of the n=6 elements (n.gtoreq.2) containing the adjacent bars and the spaces in one character to obtain each of the 2- through 6-element added patterns (element widths). The computation unit 23a converts each of the 2- through 6-element added patterns into the module number for one character to obtain the module numbers of the 2- through 6-element added patterns.

The extraction unit 23b narrows down the target characters, wherein each of the module numbers of the 2- through 6-element added patterns obtained by the computation unit 23a becomes the integer with the error within 1, and extracts the candidate character. On the premise of them, the search unit 23d compares the candidate character having the module numbers of the 2- through 6-element added patterns each extracted by the extraction unit 23b with the expected value character for evaluating the candidate character and searches for the expected value character having the strongest correlation to the candidate character.

Since in this search, the barcode data D12 for the expected value character having the strongest correlation to the candidate character extracted from the plural target characters can be outputted as the decoded result at reading the barcode symbol 1, the misreading operation of the barcode symbol 1 can be significantly prevented by comparison to the conventional barcode reading method.

In addition, the error range is expanded from .+-.0.5 of the conventional system to .+-.1.0 to increase the number of the candidate characters. Then, since the 6 element width data D10 for one character and the anteroposterior 5 element width data D10 of the target character C1 are extracted, the larger number of the candidate characters than those of the conventional method can be extracted by narrowing down the target characters wherein each of the module numbers of the 2- through 6-element added patterns becomes the integer with the error within 1.

Plural candidate characters as the decoded result can be outputted because there is a high probability such that the candidate character is not based on only the first strongest correlation but also the second, third, . . . stronger correlations. Therefore, the barcode misreading operation can be prevented significantly by comparison to the conventional barcode reading method. By changing a threshold for setting the error range, the reliability of the width data D10 can be selected.

Subsequently, another computation example (first) of the 1-element data and the 2-element added data according to the first embodiment will be discussed with reference to FIG. 5. In this example, the addition range is expanded to the characters C0 and C2 at the both sides of the target character C1. A premise is that the addition range is expanded to the two elements of the space (6) and the bar (5) of the character C0 adjacent and prior to the target character C1 or the bar (1) and the space (2) of the character C2 adjacent and posterior to the target character.

Figure 5:
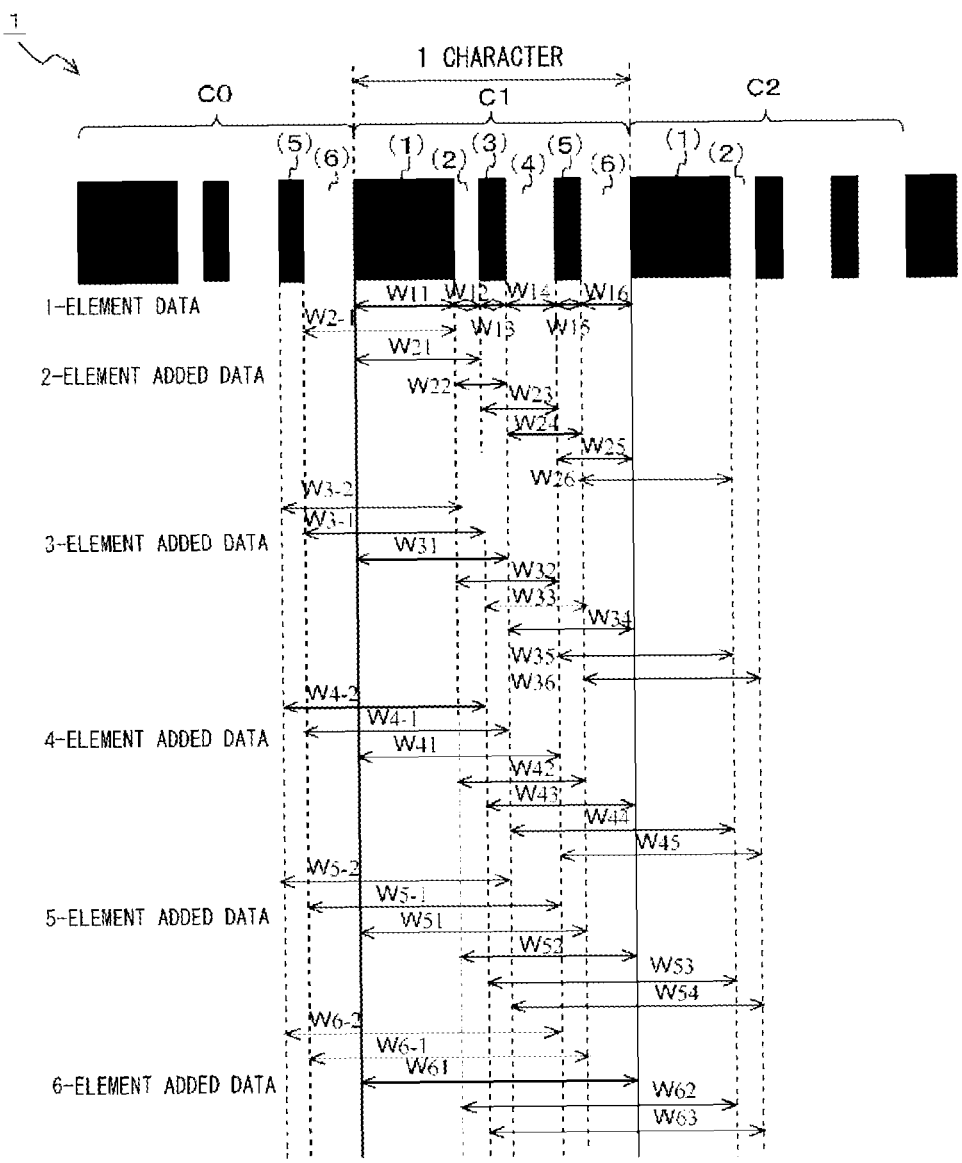
FIG. 5 is a diagram explaining another computation example (part one) of 1-element data and 2-through 6-element added data according to the first embodiment.

The character C0 is provided just before the target character C1 shown in FIG. 5 and the character C2 is provided just after the target character C1. Each of the characters C0 through C2 is composed of 11 modules for the whole width. They contain three bars (1), (3), (5) and three spaces (2), (4), (6). The module number of the bar (1) is "4" and the module number of each of the bars (3), (5) is "1". The module number of the space (2) is "1" and the module number of each of the spaces (4), (6) is "2". A case of forming the target characters will be explained by illustrating an example of the barcode having these characters C0 through C2.

W11 of the target character C1 shown in FIG. 5 is the width of the black portion bar (1). The width of the bar (1) is counted by the counter unit 4 and the counted data value forms the width W11 data. W12 is the width of the space (2) following the bar (1) of the target character C1. The width of the space (2) is counted by the counter unit 4 too and the counted data value forms the width W12 data. W13 is the width of the bar (3) following the space (2) of the target character C1. The width of the bar (3) is counted by the counter unit 4 and the counted data value forms the width W13 data.

W14 is the width of the space (4) following the bar (3) of the target character C1. The width of the space (4) is counted by the counter unit 4 too and the counted data value forms the width W14 data. W15 is the width of the bar (5) following the space (4) of the target character C1. The width of the bar (5) is counted by the counter unit 4 and the counted data value forms the width W15 data. W16 is the width of the space (6) following the bar (5) of the target character C1. The width of the space (6) is counted by the counter unit 4 and the counted data value forms the width W16 data. The above-described six kinds of the width W11 data through the width W16 data are the 1-element data of one character and constitute the width data D10. W2-1 shown in FIG. 5 is the width in which the space (6) of the just previous character C0 and the bar (1) of the target character C1 are added by the computation unit 23a. The counted data value indicating the added width of the space (6)+the bar (1) forms the width W2-1 data. W21 is the width in which the bar (1) and the space (2) of the target character C1 (hereinafter, referred to as the bar (1)+the space (2)) following the space (6) of the just previous character C0 are added by the computation unit 23a. The counted data value indicating the added width of the bar (1)+the space (2) forms the width W21 data. W22 is the width in which the space (2) and the bar (3) following the bar (1) of the target character C1 are added by the computation unit 23a. The counted data value indicating the added width of the space (2)+the bar (3) forms the width W22 data.

W23 is the width in which the bar (3) and the space (4) following the space (2) of the target character C1 are added by the computation unit 23a. The counted data value indicating the added width of the bar (3)+the space (4) forms the width W23 data. W24 is the width in which the space (4) and the bar (5) following the bar (3) of the target character C1 are added by the computation unit 23a. The counted data value indicating the added width of the space (4)+the bar (5) forms the width W24 data.

W25 is the width in which the bar (5) and the space (6) following the space (4) of the target character C1 are added by the computation unit 23a. The counted data value indicating the added width of the bar (5)+the space (6) forms the width W25 data. W26 is the width I which the space (6) following the bar (5) and the bar (1) of the just posterior character C2 are added by the computation unit 23a. The counted data value indicating the added width of the space (6)+the bar (1) forms the width W26 data. The above-described 7 kinds of the width W2-1 data through the width W26 data are the 2-element added data of one character and they form the width data D10.

W3-2 shown in FIG. 5 is the width in which the bar (5) and the space (6) of the just previous character C0 and the bar (1) of the target character (1) are added by the computation unit 23a. The counted data value indicating the added width of the bar (5)+the space (6)+the bar (1) forms the width W3-2 data. W3-1 is the width in which the space (6) of the just previous character C0 and the bar (1) and the space (2) of the target character C1 are added by the computation unit 23a. The counted data value indicating the added width of the space (6)+the bar (1)+the space (2) forms the width W3-1 data.

W31 is the width in which the bar (1), the space (2) and the bar (3) of the target character C1 are added by the computation unit 23a. The counted data value indicating the added width of the bar (1)+the space (2)+the bar (3) forms the width W31 data. W32 is the width in which the space (2), the bar (3) and the space (4) following the bar (1) of the target character C1 are added by the computation unit 23a. The counted data value indicating the added width of the space (2)+the bar (3)+the space (4) forms the width W32 data.

W33 is the width in which the bar (3), the space (4) and the bar (5) following the space (2) of the target character C1 are added by the computation unit 23a. The counted data value indicating the added width of the bar (3)+the space (4)+the bar (5) forms the width W33 data. W34 is the width in which the space (4), the bar (5) and the space (6) following the bar (3) of the target character C1 are added by the computation unit 23a. The counted data value indicating the added width of the space (4)+the bar (5)+the space (6) forms the width W34 data.

W35 is the width in which the bar (5) and the space (6) following the space (4) of the target character C1 and also the bar (1) of the just posterior character C2 are added by the computation unit 23a. The counted data value indicating the added width of the bar (5)+the space (6)+the bar (1) forms the width W35 data. W36 is the width in which the space (6) following the bar (5) of the target character C1, the bar (1) and the space (2) of the posterior character C2 are added by the computation unit 23a. The counted data value indicating the added width of the space (6)+the bar (1)+the space (2) forms the width W36 data. The above-described 8 kinds of the width W3-2 data through the width W36 data are the 3-element added data for one character and they form the width data D10.

W4-2 shown in FIG. 5 is the width in which the bar (5) and the space (6) of the just previous character C0 and the bar (1) and the space (2) of the target character C1 are added by the computation unit 23a. The counted data value indicating the added width of the bar (5)+the space (6)+the bar (1)+the space (2) forms the width W4-2 data. W4-1 is the width in which the space (6) of the just previous character C0 and the bar (1), the space (2) and the bar (3) of the target character C1 are added by the computation unit 23a. The counted data value indicating the added width of the space (6)+the bar (1)+the space (2)+the bar (3) forms the width W4-1 data.

W41 is the width in which the bar (1), the space (2), the bar (3) and the space (4) of the target character C1 are added by the computation unit 23*a*. The counted data value indicating the added width of the bar (1)+the space (2)+the bar (3)+the space (4) forms the width W41 data. W42 is the width in which the space (2), the bar (3), the space (4) and the bar (5) following the bar (1) of the target character C1 are added by the computation unit 23*a*. The counted data value indicating the added width of the space (2)+the bar (3)+the space (4)+the bar (5) forms the width W42 data.

W43 is the width in which the bar (3), the space (4), the bar (5) and the space (6) following the space (2) of the target character C1 are added by the computation unit 23*a*. The counted data value indicating the added width of the bar (3)+the space (4)+the bar (5)+the space (6) forms the width W43 data. W44 is the width in which the space (4), the bar (5) and the space (6) following the bar (3) of the target character C1 and the bar (1) of the just posterior character C2 are added by the computation unit 23*a*. The counted data value indicating the added width of the space (4)+the bar (5)+the space (6)+the bar (1) forms the width W44 data.

W45 is the widths of the bar (5) and the space (6) following the white space (4) of the target character C1 and the bar (1) and the space (2) of the just posterior character C2. The counted data value indicating the added width of the bar (5)+the space (6)+the bar (1)+the space (2) forms the width W45 data. The above-described 7 kinds of the width W2-1 data through the width W45 data are the 4-element added data for one character and they form the width data D10.

W5-2 shown in FIG. 5 is the width in which the bar (5) and the space (6) of the just previous character C0 and the bar (1), the space (2) and the bar (3) of the target character C1 are added by the computation unit 23*a*. The counted data value indicating the added width of the bar (5)+the space (6)+the bar (1)+the space (2)+the bar (3) forms the width W5-2 data. W5-1 is the width in which the space (6) of the previous character C0 and the bar (1), the space (2), the bar (3) and the space (4) of the target character C1 are added by the computation unit 23*a*. The counted data value indicating the added width of the space (6)+the bar (1)+the space (2)+the bar (3)+the space (4) forms the width W5-1 data.

W51 is the width in which the bar (1), the space (2), the bar (3), the space (4) and the bar (5) of the target character C1 are added by the computation unit 23*a*. The counted data value indicating the added width of the bar (1)+the space (2)+the bar (3)+the space (4)+the bar (5) forms the width W51 data. W52 is the width in which the space (2), the bar (3), the space (4), the bar (5) and the space (6) following the bar (1) of the target character C1 are added by the computation unit 23*a*. The counted data value indicating the added width of the space (2)+the bar (3)+the space (4)+the bar (5)+the space (6) forms the width W52 data.

W53 is the width in which the bar (3), the space (4), the bar (5) and the space (6) following the space (2) of the target character C1 and the bar (1) of the just posterior character C2 are added by the computation unit 23*a*. The counted data value indicating the added width of the bar (3)+the space (4)+the bar (5)+the space (6)+the bar (1) forms the width W53 data. W54 is the width in which the space (4), the bar (5) and the space (6) following the bar (3) of the target character C1 and the bar (1) and the space (2) of the just posterior character C2 are added by the computation unit 23*a*. The counted data value indicating the added width of the space (4)+the bar (5)+the space (6)+the bar (1)+the space (2) forms the width W54 data. The above described 6 kinds of the width W5-1 data through the width W54 data are the 5-element added data for one character and they form the width data D10.

W6-2 shown in FIG. 5 is the width in which the bar (5) and the space (6) of the just previous character C0 and the bar (1), the space (2), the bar (3) and the space (4) of the target character C1 are added by the computation unit 23*a*. The counted data value indicating the added width of the bar (5)+the space (6)+the bar (1)+the space (2)+the bar (3)+the space (4) forms the width W6-2 data.

W6-1 is the width in which the space (6) of the just previous character C0 and the bar (1), the space (2), the bar (3), the space (4) and the bar (5) of the target character C1 are added by the computation unit 23*a*. The counted data value indicating the added width of the space (6)+the bar (1)+the space (2)+the bar (3)+the space (4) and the bar (5) forms the width W6-1 data.

W61 represents the widths of the bar (1), the space (2), the bar (3), the space (4), the bar (5) and the space (6) of the target character C1 that are added by the computation unit 23*a*. The counted data value indicating the added width of the bar (1)+the space (2)+the bar (3)+the space (4)+the bar (5)+the space (6) forms the width W61 data.

W62 is the width in which the space (2), the bar (3), the space (4), the bar (5) and the space (6) following the bar (1) of the target character C1 and also the bar (1) of the just posterior character C2 are added by the computation unit 23*a*. The counted data value indicating the added width of the space (2)+the bar (3)+the space (4)+the bar (5)+the space (6)+the bar (1) forms the width W62 data.

W63 is the width in which the bar (3), the space (4), the bar (5) and the space (6) following the space (2) of the target character C1 and the bar (1) and the space (2) of the just posterior character C2 are added by the computation unit 23*a*. The counted data value indicating the added width of the bar (3)+the space (4)+the bar (5)+the space (6)+the bar (1)+the space (2) forms the width W63 data. The above-described 5 kinds of the width W6-2 data through the width W63 data are the 6-element added data for one character and they form the width data D10.

39 kinds of target characters are obtained from the counted data values outputted from the counter unit 4 wherein they are six kinds of the width W11 data through the width W16 data (1-element data), seven kinds of the width W2-1 data through the width W26 data (2-element added data), eight kinds of the width W3-2 data through the width W36 data (3-element added data), seven kinds of the width W4-2 data through the width W45 data (4-element added data), six kinds of the width W5-2 data and the width W54 data (5-element added data) and five kinds of the width W6-2 data through the width W63 data (6-element added data).

Subsequently, another computation example (second) of the 1-element data, the 2- through 6-element added data according to the first embodiment will be explained with reference to FIG. 6. In this example, the addition range is expanded to the characters C0 and C2 at the both sides of the target character C1. A premise is that the addition range is expanded to the five elements of the space (6), the bar (5), the space (4), the bar (3) and the space (2) of the character C0 adjacent and prior to the target character C1 and also the bar (1), the space (2), the bar (3) the space (4) and the bar (5) of the character C2 adjacent and posterior to the target character. A case of forming the target characters will be explained by illustrating an example of the barcode symbol 1 having the characters C0 through C2.

Figure 6:
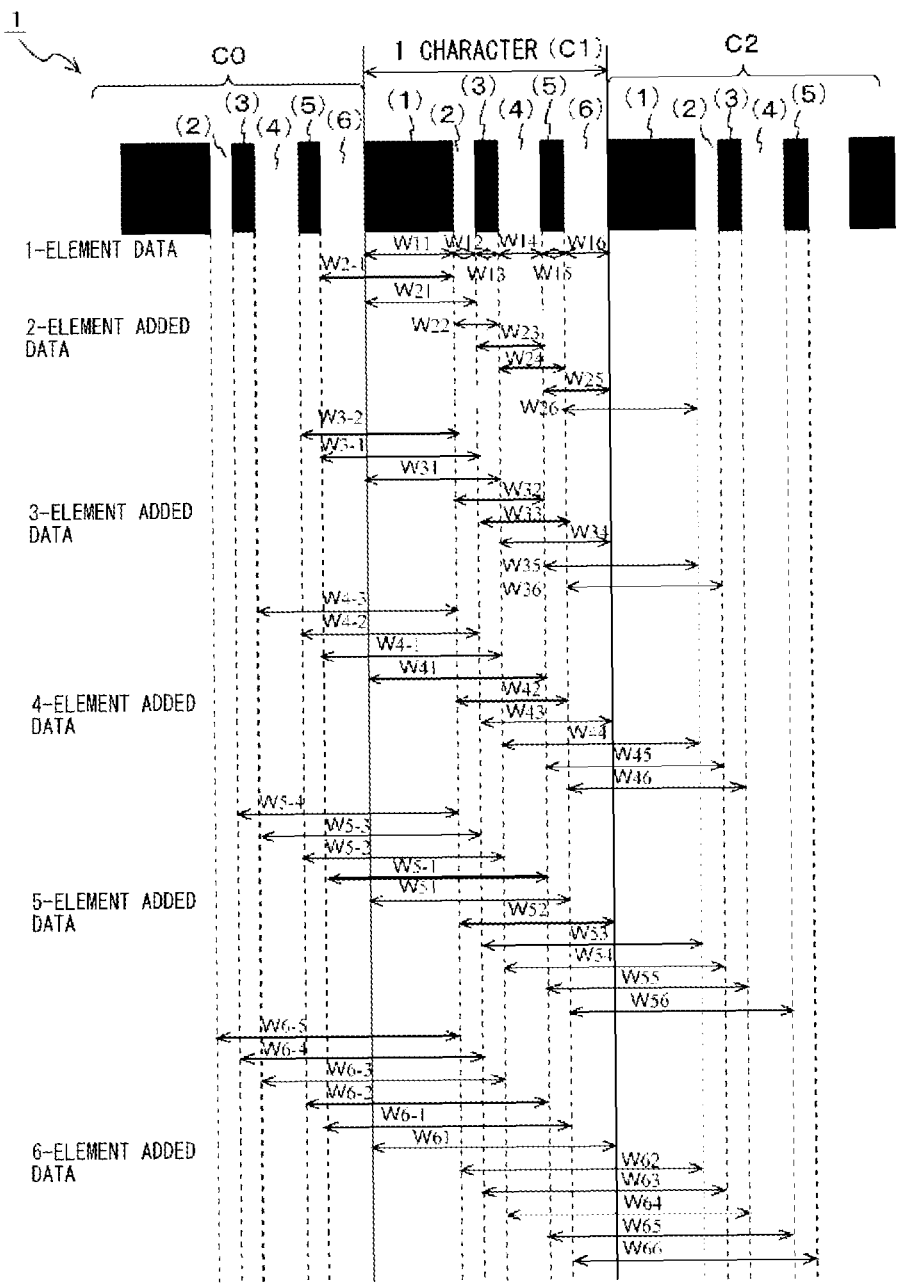
FIG. 6 is a diagram explaining another computation example (part two) of 1-element data and 2-through 6-element added data according to the first embodiment.

W11 shown in FIG. 6 is the width of the black portion bar (1) of the target character C1. The width of the bar (1) is counted by the counter unit 4 and the counted data value forms the width W11 data. W12 is the width of the space (2) following the bar (1) of the target character C1. The width of the space (2) is counted by the counter unit 4 too and the counted data value forms the width W12 data. W13 is the width of the bar (3) following the space (2). The width of the bar (3) is counted by the counter unit 4 and the counted data value forms the width W13 data.

W14 is the width of the space (4) following the bar (3) of the target character C1. The width of the space (4) is counted by the counter unit 4 too and the counted data value forms the width W14 data. W15 represents the width of the bar (5) following the space (4) of the target character C1. The width of the bar (5) is counted by the counter unit 4 and the counted data value forms the width W15 data. W16 represents the width of the space (6) following the bar (5) of the target character C1. The width of the space (6) is counted by the counter unit 4 and the counted data value forms the width W16 data. The above-described six kinds of the width W11 data through the width W16 data are the 1-element data for one character and they form the width data D10.

W2-1 shown in FIG. 6 is the width in which the space (6) of the just previous character C0 and the bar (1) of the target character C1 are added by the computation unit 23a. The counted data value indicating the added width of the space (6)+the bar (1) forms the width W2-1 data. W21 is the width in which the bar (1) and the space (2) (hereinafter, referred to as the bar (1)+the space (2)) following the space (6) of the just previous character C0 are added by the computation unit 23a. The counted data value indicating the added width of the bar (1)+the space (2) forms the width W21 data. W22 is the width in which the space (2) and the bar (3) following the bar (1) of the target character C1 are added by the computation unit 23a. The counted data value indicating the added width of the space (2)+the bar (3) forms the width W22 data.

W23 is the width in which the bar (3) and the space (4) following the space (2) of the target character C1 are added by the computation unit 23a. The counted data value indicating the added width of the bar (3)+the space (4) forms the width W23 data. W24 is the width in which the space (4) and the bar (5) following the bar (3) of the target character C1 are added by the computation unit 23a. The counted data value indicating the added width of the space (4)+the bar (5) forms the width W24 data. W25 is the width in which the bar (5) and the space (6) following the space (4) of the target character C1 are added by the computation unit 23a. The counted data value indicating the added width of the bar (5)+the space (6) forms the width W25 data. W26 is the width in which the space (6) following the bar (5) of the target character C1 and the bar (1) of the just posterior character C2 are added by the computation unit 23a. The counted data value indicating the added width of the space (6)+the bar (1) forms the width W26 data. The above-described 7 kinds of the width W2-1 data through the width W26 data are the 2-element added data of one character and they form the width data D10.

W3-2 shown in FIG. 6 is the width in which the bar (5) and the space (6) of the just previous character C0 and the bar (1) of the target character (1) are added by the computation unit 23a. The counted data value indicating the added width of the bar (5)+the space (6)+the bar (1) forms the width W3-2 data. W3-1 is the width in which the space (6) of the just previous character C0 and the bar (1) and the space (2) of the target character C1 are added by the computation unit 23a. The counted data value indicating the added width of the space (6)+the bar (1)+the space (2) forms the width W3-1 data.

W31 is the width in which the bar (1), the space (2) and the bar (3) of the target character C1 are added by the computation unit 23a. The counted data value indicating the added width of the bar (1)+the space (2)+the bar (3) forms the width W31 data. W32 is the width in which the space (2), the bar (3) and the space (4) following the bar (1) of the target character C1 are added by the computation unit 23a. The counted data value indicating the added width of the space (2)+the bar (3)+the space (4) forms the width W32 data.

W33 is the width in which the bar (3), the space (4) and the bar (5) following the space (2) of the target character C1 are added by the computation unit 23a. The counted data value indicating the added width of the bar (3)+the space (4)+the bar (5) forms the width W33 data. W34 is the width in which the space (4), the bar (5) and the space (6) following the bar (3) are added by the computation unit 23a. The counted data value indicating the added width of the space (4)+the bar (5)+the space (6) forms the width W34 data.

W35 is the width in which the bar (5) and the space (6) following the space (4) of the target character C1 and the bar (1) of the just posterior character C2 are added by the computation unit 23a. The counted data value indicating the added width of the bar (5)+the space (6)+the bar (1) forms the width W35 data. W36 is the width in which the space (6) following the bar (3) of the target character C1 and the bar (1) and the space (2) of the posterior character C2 are added by the computation unit 23a. The counted data value indicating the added width of the space (6)+the bar (1)+space (2) forms the width W36 data. The above-described 8 kinds of the width W3-2 data through the width W36 data are the 3-element added data for one character and they form the width data D10.

W4-3 shown in FIG. 6 is the width in which the space (4), the bar (5) and the space (6) of the just previous character C0 and the bar (1) are added by the computation unit 23a. The counted data value indicating the added width of the space (4)+the bar (5)+the space (6)+the bar (1) forms the width W4-3 data. W4-2 is the width in which the bar (5) and the space (6) of the just previous character C0 and the bar (1) and the space (2) of the target character C1 are added by the computation unit 23a. The counted data value indicating the added width of the bar (5)+the space (6)+the bar (1)+the space (2) forms the width W4-2 data.

W4-1 is the width in which the space (6) of the just previous character C0 and the bar (1), the space (2) and the bar (3) of the target character C1 are added by the computation unit 23a. The counted data value indicating the added width of the space (6)+the bar (1)+the space (2)+the bar (3) forms the width W4-1 data. W41 is the width in which the bar (1), the space (2), the bar (3) and the space (4) of the target character C1 are added by the computation unit 23a. The counted data value indicating the added width of the bar (1)+the space (2)+the bar (3)+the space (4) forms the width W41 data. W42 is the width in which the space (2), the bar (3), the space (4) and the bar (5) following the bar (1) of the target character C1 are added by the computation unit 23a. The counted data value indicating the added width of the space (2)+the bar (3)+the space (4)+the bar (5) forms the width W42 data.

W43 is the width in which the bar (3), the space (4), the bar (5) and the space (6) following the space (2) of the target character C1 are added by the computation unit 23a. The counted data value indicating the added width of the bar (3)+the space (4)+the bar (5)+the space (6) forms the width W43 data. W44 is the width in which the space (4), the bar (5) and the space (6) following the bar (3) of the target character C1 and the bar (1) of the just posterior character C2 are added by the computation unit 23a. The counted data value indicating the added width of the space (4)+the bar (5)+the space (6)+the bar (1) forms the width W44 data.

W45 is the width in which the bar (5) and the space (6) following the white space (4) of the target character C1 and the bar (1) and the space (2) of the just posterior character C2 are added by the computation unit 23a. The counted data value indicating the added width of the bar (5)+the space (6)+the bar (1)+the space (2) forms the width W45 data. W46 is the width in which the space (6) following the white bar (5) of the target character C1 and the bar (1), the space (2) and the bar (3) of the just posterior character C2 are added by the computation unit 23a. The counted data value indicating the added width of the space (6)+the bar (1)+the space (2)+the bar (3) forms the width W46 data. The above-described 9 kinds of the width W4-3 data through the width W46 data are the 4-element added data for one character and they form the width data D10.

W5-4 shown in FIG. 6 is the width in which the bar (3), the space (4), the bar (5) and the space (6) of the just previous character C0 and the bar (1) of the character C1 are added by the computation unit 23a. The counted data value indicating the added width of the bar (3)+the space (4)+the bar (5)+the space (6)+the bar (1) forms the width W5-4 data. W5-3 is the width in which the space (4), the bar (5) and the space (6) of the just previous character C0 and the bar (1) and the space (2) of the character C1 are added by the computation unit 23a. The counted data value indicating the added width of the space (4)+the bar (5)+the space (6)+the bar (1)+the space (2) forms the width W5-3 data.

W5-2 is the width in which the bar (5) and the space (6) of the just previous character C0 and the bar (1), the space (2) and the bar (3) of the target character C1 are added by the computation unit 23a. The counted data value indicating the added width of the bar (5)+the space (6)+the bar (1)+the space (2)+the bar (3) forms the width W5-2 data. W5-1 is the width in which the space (6) of the just previous character C1 and the bar (1), the space (2), the bar (3) and the space (4) of the target character C1 are added by the computation unit 23a. The counted data value indicating the added width of the space (6)+the bar (1)+the space (2)+the bar (3)+the space (4) forms the width W5-1 data.

W51 is the width in which the bar (1), the space (2), the bar (3), the space (4) and the bar (5) of the target character C1 are added by the computation unit 23a. The counted data value indicating the added width of the bar (1)+the space (2)+the bar (3)+the space (4)+the bar (5) forms the width W51 data. W52 is the width in which the space (2), the bar (3), the space (4), the bar (5) and the space (6) following the bar (1) of the target character C1 are added by the computation unit 23a. The counted data value indicating the added width of the space (2)+the bar (3)+the space (4)+the bar (5)+the space (6) forms the width W52 data.

W53 is the width in which the bar (3), the space (4), the bar (5) and the space (6) following the space (2) of the target character C1 and the bar (1) of the just posterior character C2 are added by the computation unit 23a. The counted data value indicating the added width of the bar (3)+the space (4)+the bar (5)+the space (6)+the bar (1) forms the width W53 data. W54 is the width in which the space (4), the bar (5) and the space (6) following the bar (3) of the target character C1 and the bar (1) and the space (2) of the just posterior character C2 are added by the computation unit 23a. The counted data value indicating the added width of the space (4)+the bar (5)+the space (6)+the bar (1)+the space (2) forms the width W54 data.

W55 is the width in which the bar (5) and the space (6) following the space (4) of the target character C1 and the bar (1), the space (2) and the bar (3) of the just posterior character C2 are added by the computation unit 23a. The counted data value indicating the added width of the bar (5)+the space (6)+the bar (1)+the space (2)+the bar (3) forms the width W55 data. W56 is the width in which the space (6) following the bar (5) of the target character C1 and the bar (1), the space (2), the bar (3) and the space (4) of the just posterior character C2 are added by the computation unit 23a. The counted data value indicating the added width of the space (6)+the bar (1)+the space (2)+the bar (3)+the space (4) forms the width W56 data. The above-described 10 kinds of the width W5-4 data through the width W56 data are the 5-element added data for one character and they form the width data D10.

W6-5 shown in FIG. 6 is the width in which the space (2), the bar (3), the space (4), the bar (5) and the space (6) of the just previous character C0 and the bar (1) of the target character C1 are added by the computation unit 23a. The counted data value indicating the added width of the space (2)+the bar (3)+the space (4)+the bar (5)+the space (6)+the bar (1) forms the width W6-5 data. W6-4 is the width in which the bar (3), the space (4), the bar (5) and the space (6) of the just previous character C0 and the bar (1) and the space (2) of the target character C1 are added by the computation unit 23a. The counted data value indicating the added width of the bar (3)+the space (4)+the bar (5)+the space (6)+the bar (1)+the space (2) forms the width W6-5 data.

W6-3 is the width in which the space (4), the bar (5) and the space (6) of the just previous character C0 and the bar (1), the space (2) and the bar (3) of the target character C1 are added by the computation unit 23a. The counted data value indicating the added width of the space (4)+the bar (5)+the space (6)+the bar (1)+the space (2)+the bar (3) forms the width W6-3 data. W6-2 is the width in which the bar (5)+the space (6) of the just previous character C0+the bar (1)+the space (2)+the bar (3)+the space (4) of the target character C1 are added by the computation unit 23a. The counted data value indicating the added width of the bar (5)+the space (6)+the bar (1)+the space (2)+the bar (3)+the space (4) of the character C1 forms the width W6-2 data.

W6-1 is the width in which the space (6) of the just previous character C0+the bar (1)+the space (2)+the bar (3)+the space (4)+the bar (5) of the character C1 are added by the computation unit 23a. The counted data value indicating the added width of the space (6)+the bar (1)+the space (2)+the bar (3)+the space (4)+the bar (5) of the character C1 forms the width W6-1 data.

W61 is the width in which the bar (1), the space (2), the bar (3), the space (4), the bar (5) and the space (6) of the target character C1 are added by the computation unit 23a. The counted data value indicating the added width of the bar (1)+the space (2)+the bar (3)+the space (4)+the bar (5)+the space (6) forms the width W61 data.

W62 is the width in which the space (2), the bar (3), the space (4), the bar (5) and the space (6) following the bar (1) of the target character C1 and the bar (1) of the just posterior character C2 are added by the computation unit 23a. The counted data value indicating the added width of the space (2)+the bar (3)+the space (4)+the bar (5)+the space (6)+the bar (1) forms the width W62 data.

W63 is the width in which the bar (3), the space (4), the bar (5) and the space (6) following the space (2) of the target character C1 and the bar (1) and the space (2) of the just posterior character C2 are added by the computation unit 23a. The counted data value indicating the added width of the bar (3)+the space (4)+the bar (5)+the space (6)+the bar (1)+the space (2) forms the width W63 data.

W64 is the width in which the space (4), the bar (5) and the space (6) following the bar (3) of the target character C1 and the bar (1), the space (2) and the bar (3) of the just posterior character C2 are added by the computation unit 23a. The counted data value indicating the added width of the space (4)+the bar (5)+the space (6)+the bar (1)+the space (2)+the bar (3) of the just posterior character C2 forms the width W64 data.

W65 is the width in which the bar (5) and the space (6) following the space (4) of the target character C1 and the bar (1), the space (2), the bar (3) and the space (4) of the just posterior character C2 are added by the computation unit 23a. The counted data value indicating the added width of the bar (5)+the space (6)+the bar (1)+the space (2)+the bar (3)+the space (4) of the just posterior character C2 forms the width W65 data.

W66 is the width in which the space (6) following the bar (5) of the target character C1 and the bar (1), the space (2), the bar (3), the space (4) and the bar (5) of the just posterior character C2 are added by the computation unit 23a. The counted data value indicating the added width of the space (6)+the bar (1)+the space (2)+the bar (3)+the space (4)+the bar (5) of the just posterior character C2 forms the width W66 data. The above-described 11 kinds of the width W6-5 data through the width W66 data are the 6-element added data for one character and they form the width data D10.

In this example, according to the counted data value outputted from the counter unit 4 shown in FIG. 1, fifty-one kinds of target characters are obtained wherein they are six kinds of the width W11 data through the width W16 data (1-element data), seven kinds of the width W2-1 data through the width W26 data (2-element added data), eight kinds of the width W3-2 data through the width W36 data (3-element added data), nine kinds of the width W4-3 data through the width W46 data (4-element added data), ten kinds of the width W5-4 data and the width W56 data (5-element added data) and eleven kinds of the width W6-5 data through the width W66 (6-element added data).

Embodiment 2

The decode example according to the second embodiment will be explained with reference to FIG. 7A, FIG. 7B, FIG. 7C through FIG. 10. Now, the barcode symbol example of the CODE 128, its defective example and its reconstruction example will be described with reference to FIG. 7A through FIG. 7C. The barcode symbol 1 of the CODE 128 shown in FIG. 7A has the bars and spaces having no lack and scratch. The barcode symbol 1 is composed of eight characters, for example, the barcode data D12 represents numeric numbers, "1 2 3 4 5 6 7 8".

In a barcode symbol 1' of the CODE 128 shown in FIG. 7B, the bars, spaces, etc. have lacks and scratches. It is assumed that the barcode symbol 1' is derived from the barcode symbol 1 of the CODE 128 shown in FIG. 7A. In the drawing, three horizontal dotted lines indicate threshold values th1 through th3. The threshold values th1 through th3 are positioned at the upper, middle and lower portions that are orthogonal with a canning direction.

When the barcode symbol 1' is scanned by using the threshold value th1 as a reference to read the data, the characters "3" and "4" are lacked because of the scratches, etc. When the barcode symbol 1' is scanned by using the threshold value th2 as the reference to read the data, the characters "3" through "6" are lacked because of the scratches, etc. When the barcode symbol 1' is scanned by using the threshold value th3 as the reference to read the data, the characters "7" and "8" are lacked because of the scratches, etc.

As shown in FIG. 7C, the decoded result using the threshold value th1 as the reference is to output the barcode data representing "1 2 ? ? 5 6 7 8". "3" and "4" are not decoded. The decoded result using the threshold value th2 as the reference is to output the barcode data representing "1 2 ? ? ? ? 7 8". "3" through "6" are not decoded. The decoded result using the threshold value th3 as the reference is to output the barcode data representing "1 2 3 4 5 6 ? ?". "7" and "8" are not decoded.

In the second embodiment, even if the bars and the spaces have lacks, scratches or the like as shown in FIG. 7B, "1 2 ? ? 5 6 7 8", "1 2 ? ? ? ? 7 8", "1 2 3 4 5 6 ? ?", etc. are reconstructed to the barcode data D12 representing "1 2 3 4 5 6 7 8".

In this example, the upper, middle and lower portions orthogonal with the scanning direction are scanned one after another, the error characters are corrected, the CD (check digit) is compared when the error character disappears, and then the barcode data D12 is formed. Therefore, even if the barcode symbol 1 has elements a part of which is lacked because of contamination, blurring or the like, it is possible to read the same.

Although the first embodiment has been explained by using only the width data D10 in one character, the edge portion of the width data D10 in one character is less used. For example, the width W11 data of the bar (1) of the target character C1 is used for only the added width W21 when computing the 2-element added pattern; however, the width W12 data of the space (2) is used for the added width W21 and the added width W22 when computing the 2-element added pattern. Thus, the second embodiment computes the element portions including the characters C0 and C2 adjacent to the character C1.

The decode example (first through third) for the obfuscation characters according to the second embodiment will be explained with reference to FIG. 8 through FIG. 10. In this embodiment, the addition range for the pattern recognition is expanded to the elements of the two both-side characters. The assumption is that the addition range is expanded to five elements of the space (6), the bar (5), the space (4), the bar (3) and the space (2) in the character C0 adjacent and prior to the target character and to five elements of the bar (1), the space (2), the bar (3), the space (4) and the bar (5) of the just posterior character C2. It is assumed that the decoded result is obtained from fifty-one kinds of target characters because of the expansion of the addition range (multi-scan reconstruction).

Figure 8:
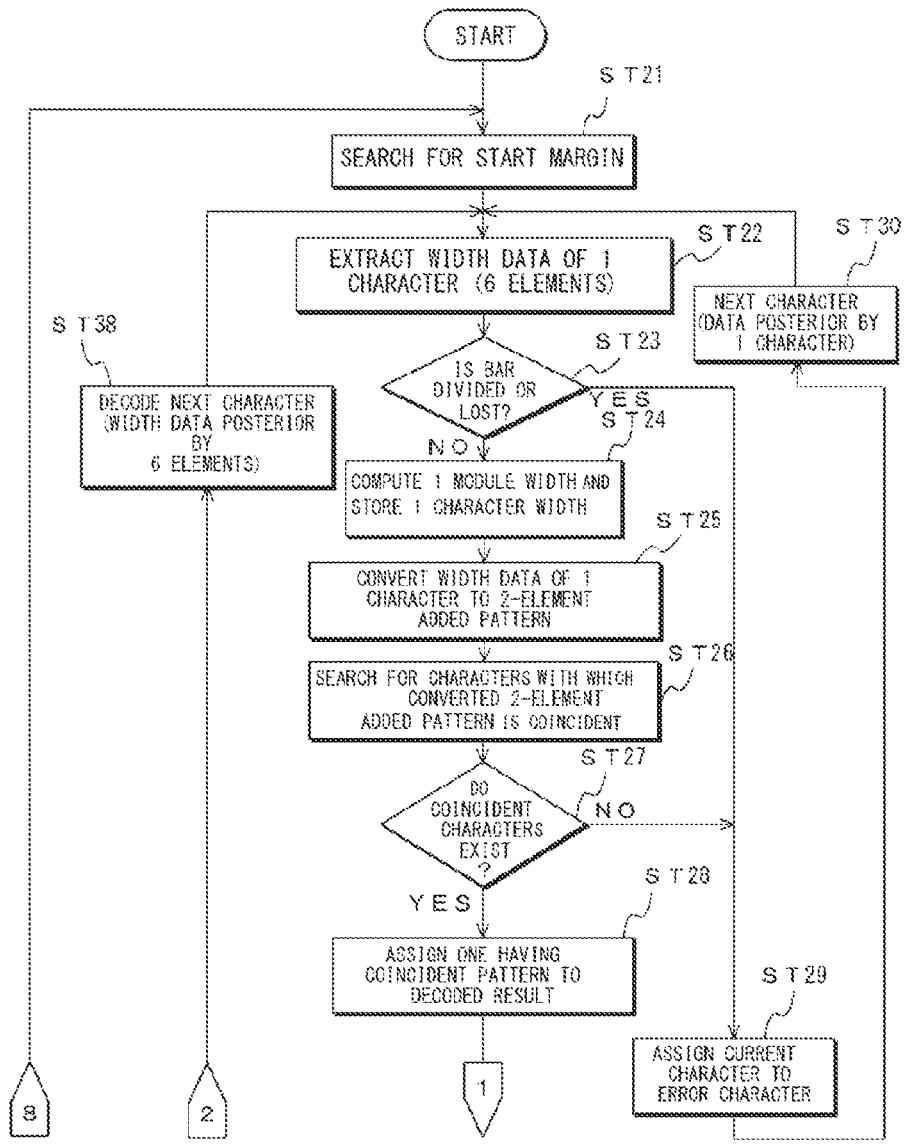
FIG. 8 is a flow chart showing a decode example (part one) of obfuscation character according to a second embodiment.

Under these decoding conditions, the CPU 23 searches for the start margin at a step ST21 of the flow chart shown in FIG. 8. At this time, the optical reading unit 2 reads the barcode symbol 1 and generates the code readout data D2, which is similar to the first embodiment. The code readout data D2 is outputted from the optical reading unit 2 to the counter unit 4. The clock generation unit 3 applies the CLK signal for sampling with a predetermined frequency to the counter unit 4.

The counter unit 4 receives the code readout data D2 from the optical reading unit 2 and the CLK signal from the clock generation unit 3, counts the code readout data D2 on the basis of the CLK signal and converts the code readout data D2 into the counted data D4 indicating the 1-element width and the 2-element added width of the elements containing the white portion spaces and the black portion bars. The counted data D4 is the numerical number data train indicating each of the widths of the bars (black portions) and the widths of the spaces (white portions) in the barcode symbol 1. The counted data D4 is stored in the width data storage unit 10. The start margin search will not be explained.

Figure 15:
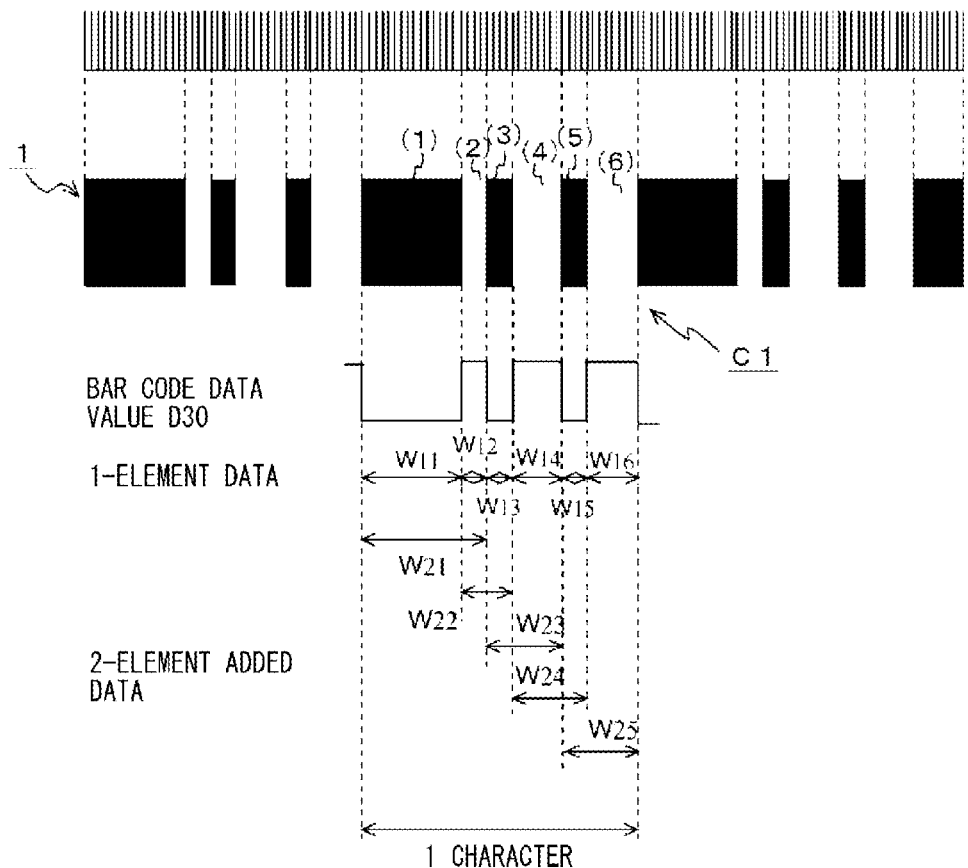
FIG. 15 is a diagram showing a computation example of a 2-element added data.
Figure 16:
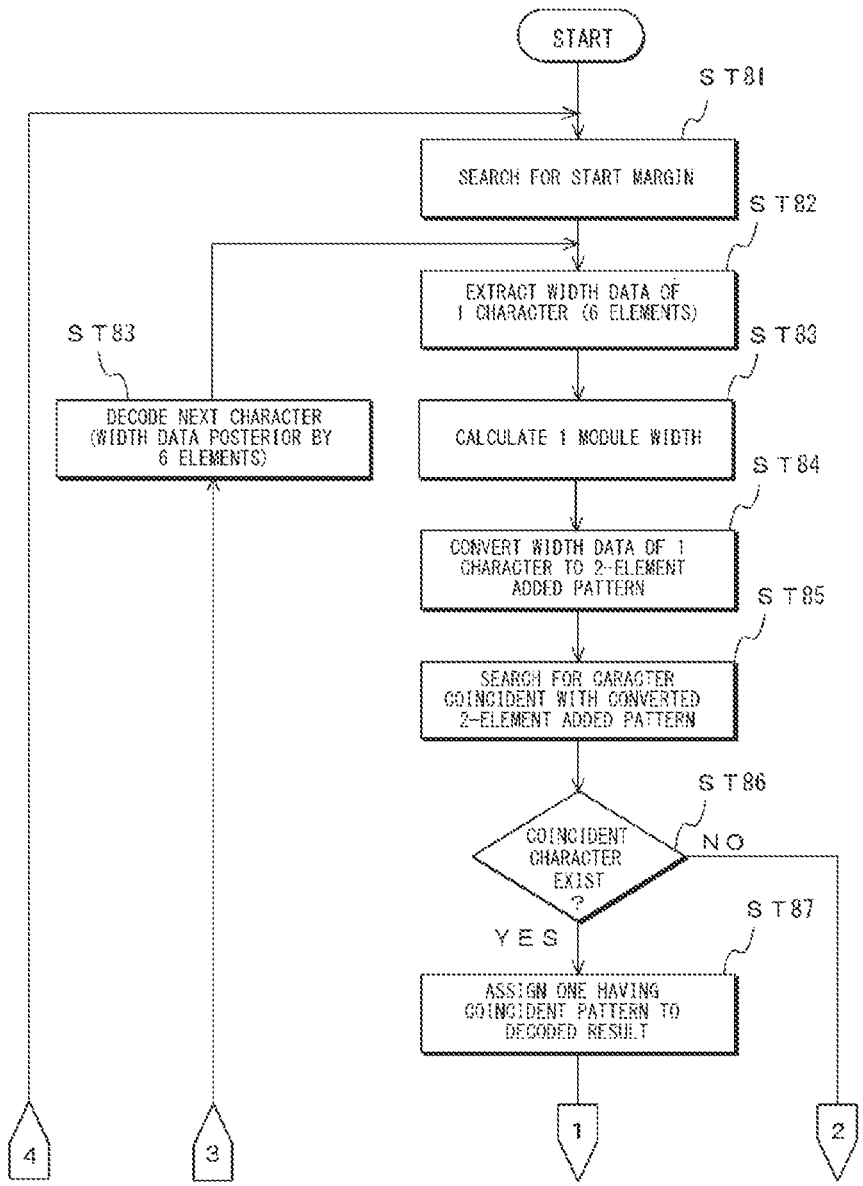
FIG. 16 is a flow chart showing a decode example (part one) of obfuscation character.
Figure 17:
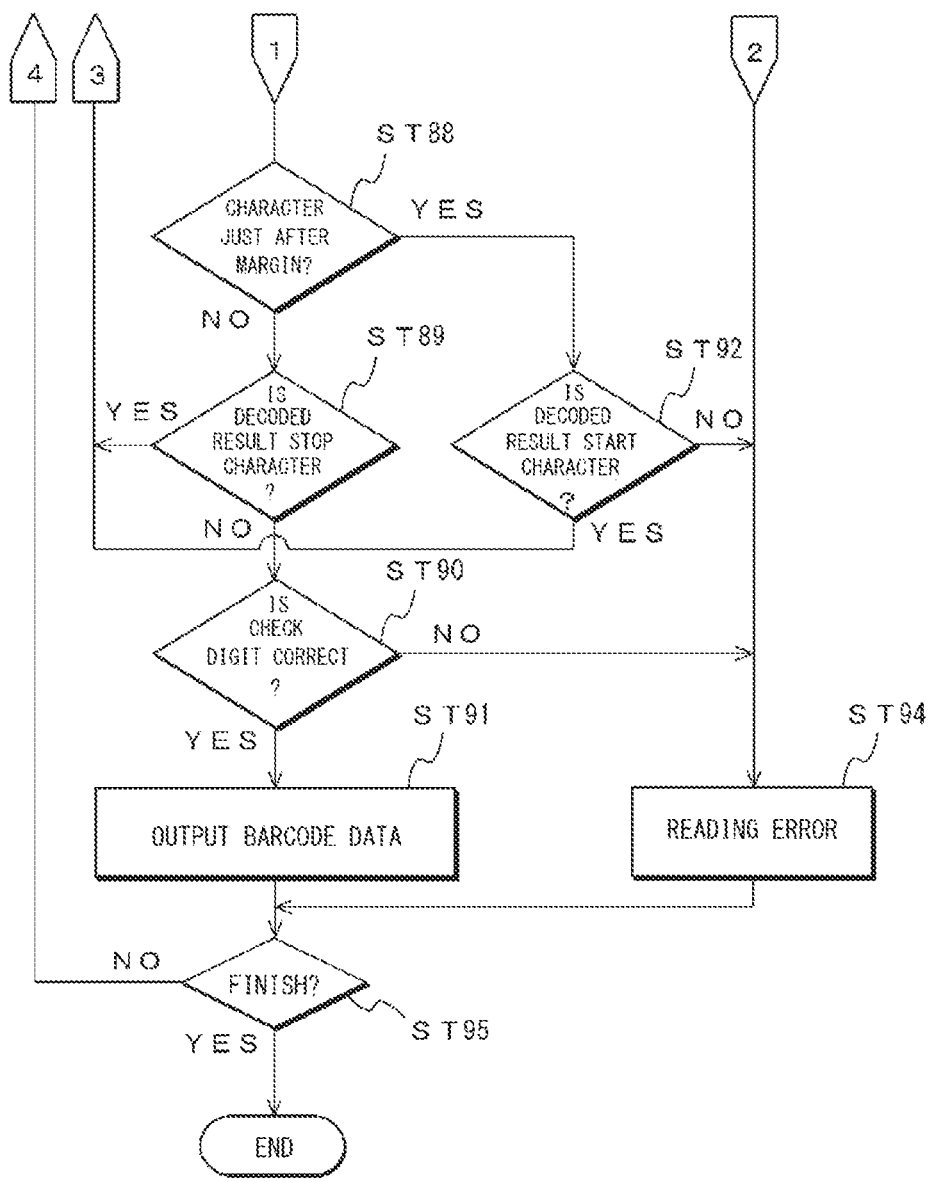
FIG. 17 is a flow chart showing the decode example (part two) of the obfuscation character.

In a step ST22, the CPU 23 extracts the width data for one character (6 elements). According to the character C1 shown in FIG. 15, the counter unit 4 counts the width W11 of the black portion bar (1) and the counted data value becomes the width W11 data. The counter unit 4 counts the width W12 of the white portion space (2) following the bar (1) and the counted data value becomes the width W12 data. The counter unit 4 counts the width W13 of the bar (3) following the space (2) and the counted data value becomes the width W13 data.

The counter unit 4 counts the width W14 of the space (4) following the bar (3) and the counted data value becomes the width W14 data. The counter unit 4 counts the width W15 of the bar (5) following the space (4) and the counted data value becomes the width W15 data. The counter unit 4 counts the width W16 of the space (6) following the bar (5) and the counted data value becomes the width W16 data. The above-described six kinds of the width W11 data through the width W16 data constitute the barcode data value D30. The barcode data value D30 is applied through the interface unit 11 to the CPU 23.

In a step ST23, the CPU 23 branches the control in accordance with a fact if the bar is divided or lost. To determine the existence of the division or disappearance of the bar, the sum of the six widths is compared with one character width and it is determined if the width data D10 for one character is proper. Here, the sum value of the widths of six elements containing the adjacent bars and spaces in one character is compared with the whole width value indicating the whole width of one character and it is determined if the width data D10 of one character is proper or not in accordance with the comparison result.

In this example, the comparison unit 23c in the CPU 23 compares the sum of the widths W1 through W6 of the 6 adjacent elements of the bar (1), the space (2), the bar (3), the space (4), the bar (5) and the space (6) in one character with the whole width value indicating the whole width of one character. It can be determined if the width data D10 for one character is proper or not in accordance with the comparison result of the comparison unit 23c and it can be determined the bar of the character is lost or divided in accordance with this determination. It is possible to combine the decoded results of the plural scanning operations and to read the barcode having heavy contamination or blurring.

Since the character frame can be determined from the whole widths of the characters C0 and C2 before and after the character C1, the decoding operation can be continued even if the element is too much or too little because of void, spot or the like. Since the target characters can be narrowed down in accordance with the determination result of the lost or divided bar, the computational complexity can be reduced and the high speed process can be accomplished.

If the bar is not divided or lost, the CPU 23 computes the 1-module width and stores 1 character width at a step 24. At this time, the computation unit 23a computes the 1-module width of the character C1 in accordance with the six kinds of the width W11 data through the width W16 data. The one character width is derived by summing the widths W1 through W6 of the six adjacent elements of the bar (1), the space (2), the bar (3), the space (4), the bar (5) and the space (6) in one character shown in FIG. 7B.

In a step ST25, CPU 23 converts the width data D10 for one character into the 2-element added pattern. For example, the counted data value indicating the added width W2-1 wherein the space (6) of the just previous character C0 shown in FIG. 7C and the bar (1) of the target character C1 are added by the computation unit 23a becomes the width W2-1 data.

Similarly, the counted data value indicating the added width W21 wherein the bar (1) and the space (2) following the space (6) of the just previous character C0 are added by the computation unit 23a becomes the width W21 data. The counted data value indicating the added width W22 wherein the space (2) and the bar (3) following the bar (1) of the target character C1 are added by the computation unit 23a becomes the width W22 data.

The counted data value indicating the added width W23 wherein the bar (3) and the space (4) following the space (2) of the target character C1 are added by the computation unit 23a becomes the W23 data. The counted data value indicating the added width W24 wherein the space (4) and the bar (5) following the bar (3) of the target character C1 are added by the computation unit 23a becomes the width W24 data.

The counted data value indicating the added width W25 wherein the bar (5) and the space (6) following the space (4) of the target character C1 are added by the computation unit 23a becomes the width W25 data. The counted data value indicating the added width W26 wherein the space (4) following the bar (3) of the target character C1 and the bar (1) of the just posterior character C2 are added by the computation unit 23a becomes the width W26 data. The above-described seven kinds of the width W2-1 data through the width W26 data are the 2-element data for one character and are formed by the width data D10.

After that, at a step ST26, the CPU 23 searches for the characters with which the previously converted 2-element added pattern is coincident. In this example, the search unit 23d searches for the characters which are coincident to the width data D10 among fifty-one kinds of target characters C1 on the basis of the counted data value from the counter unit 4 shown in FIG. 1 wherein the fifty-one kinds of the target characters are six kinds of the width W11 data through the width W16 data (1-element data), seven kinds of the width W2-1 data through the width W26 data (2-element added data), eight kinds of the width W3-2 data through the width W36 data (3-element added data), nine kinds of the width W4-3 data through the width W46 data (4-element added data), ten kinds of the width W5-4 data and the width W56 data (5-element added data) and eleven kinds of the width W6-5 data through the width W66 (6-element added data). At this time, the target characters are narrowed down by searching for the target character which is coincident with either of two kinds of target characters because there are two kinds of target characters for each element width. This narrowing down allows about one through four candidate characters to be searched.

In a step ST27, the CPU 23 branches the control in accordance with the existence of the coincident character. If the coincident characters exist, the target character with which the 2-element added pattern is coincident is assigned to the decoded result in a step ST28. After that, the process proceeds to a step ST31 shown in FIG. 9.

If the divided or lost bar exists in the step ST23 and if the coincident characters do not exist in the step ST27, the CPU 23 assigns the current character to the error character in a step ST29. After that, the CPU 23 decodes the next character (data posterior by one character) in a step ST30. After that, the process returns to the step ST22 and the above described processes will be repeated.

Figure 9:
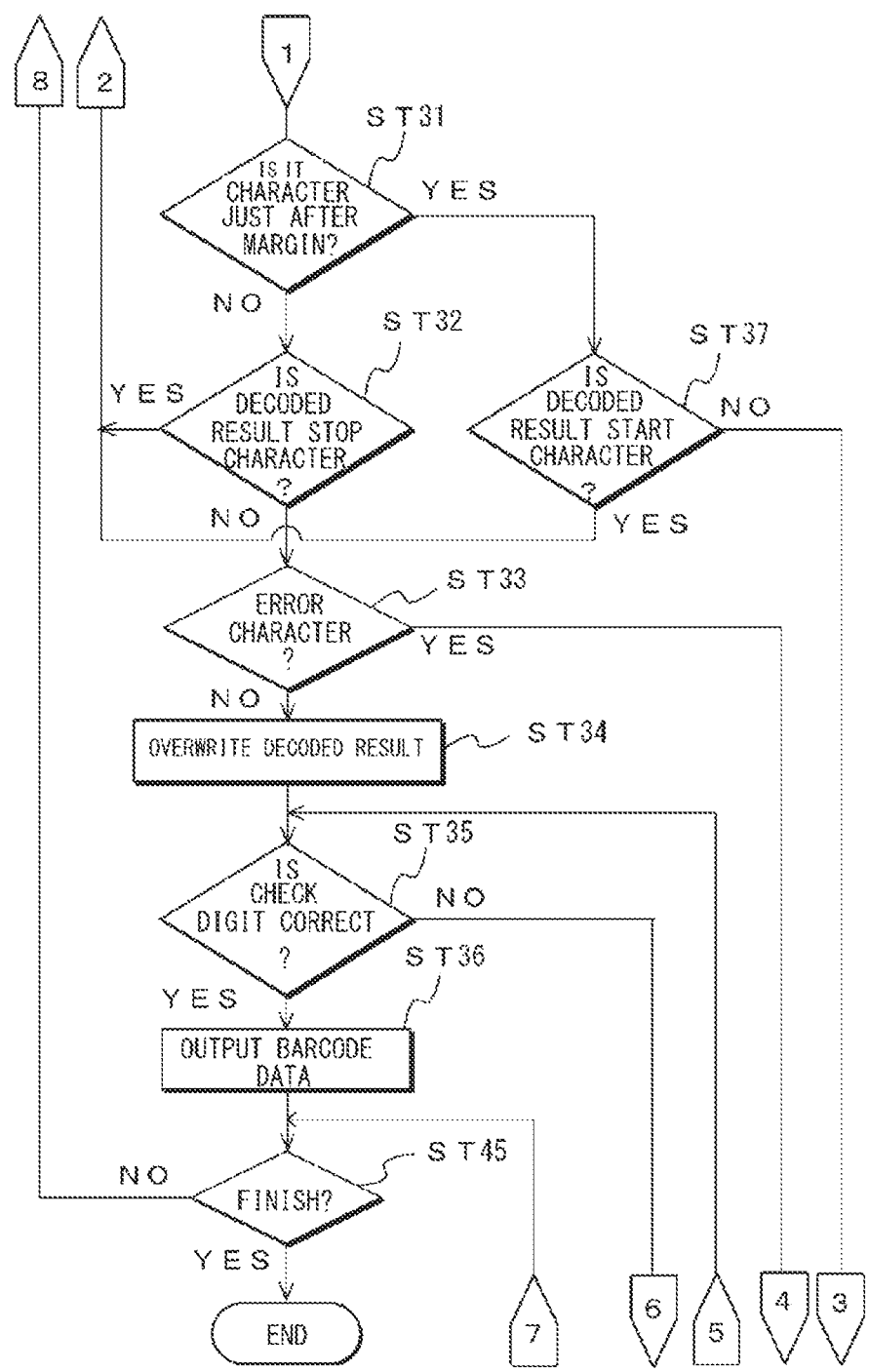
FIG. 9 is a flow chart showing the decode example (part two) of the obfuscation character.

For the candidate characters assigned to the decoded result in the above described step ST28, the CPU 23 branches the control in accordance with a fact if each character is a character just after the margin or not in the step ST31 shown in FIG. 9. If each candidate character assigned to the decoded result is not the character just after the margin, the process goes to a step ST32 where the CPU 23 branches the control in accordance with a fact if the decoded result is the stop character or not. If the decoded result is not the stop character, the process goes to a step ST33 where the CPU 23 branches the control in accordance with a fact if the error character exists or not in the decoded result.

If the error character does not exist in the error result, the process goes to a step ST34 where the CPU 23 overwrites the decoded result of the current scanning in the decode buffer 25. After that, the process goes to a step ST35 where the CPU 23 executes the error detection (parity check) and branches the control in accordance with a fact if the check digit is correct or not. If the check digit is correct, the CPU 23 completes the readout operation at a step 36 where the barcode data is outputted from the decode buffer 25 and the decode buffer 25 is cleared (normal finish). Then, the process goes to a step ST45.

If the character is a character just after the margin in the step ST31, the process goes to a step ST37 where the CPU 23 branches the control in accordance with a fact if the decoded result is the start character or not. If the decoded result is the start character in the above described step ST37 and if the decoded result is the stop character in the step ST32, the process goes to the step ST38. In the step ST38, the CPU 23 decodes the next character (width data posterior by 6 elements). After that, the process returns to the step ST22.

Figure 10:
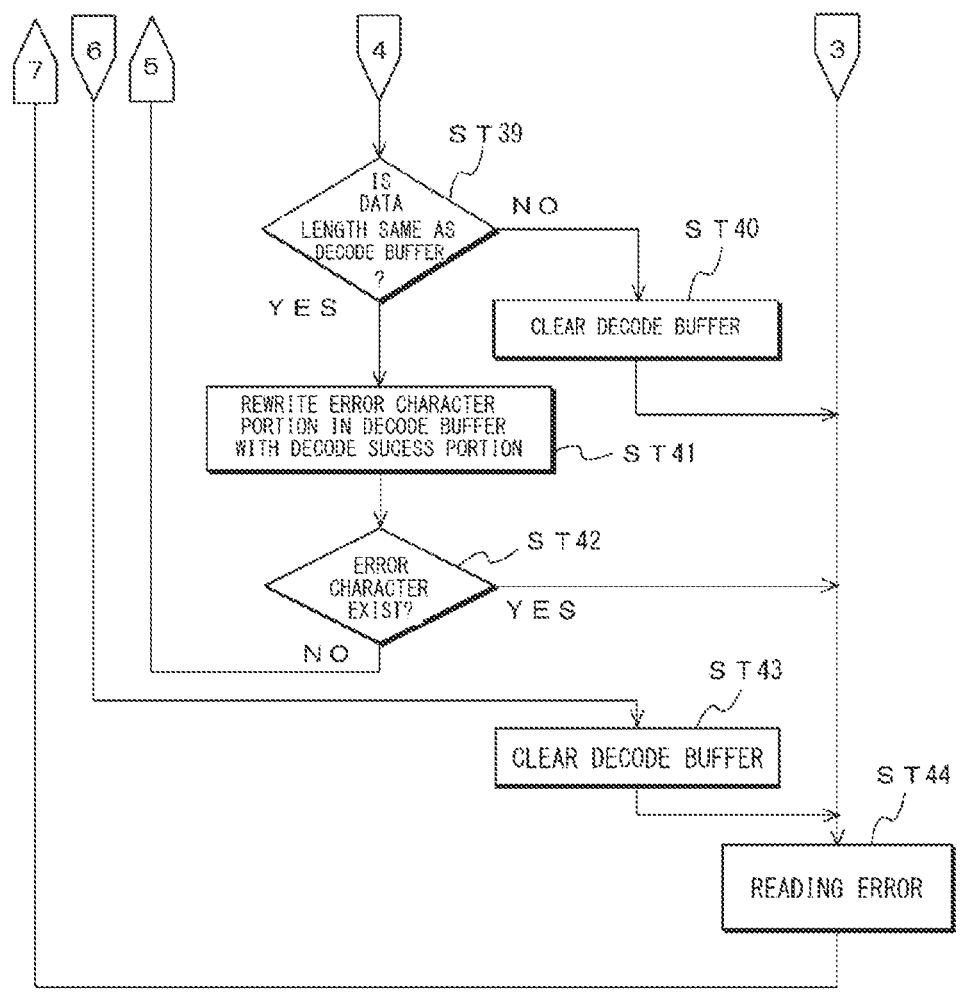
FIG. 10 is a flow chart showing the decode example (part three) of the obfuscation character.

If the error character exists in the decoded result in the step ST33, the CPU 23 branches the control in a step ST39 shown in FIG. 10 in accordance with a fact if the length of the decode buffer 25 is the same as the decode data length or not. If the length of the decode buffer 25 is the same as the decode data length, when the error character portion in the decode buffer 25 is decoded successfully, the data is rewritten in a step ST41. After that, the process goes to a step ST42 where the control is branched in accordance with a fact if the error character exists or not in the decode buffer 25. If the error character does not exist in the decode buffer 25, the process returns to the step ST35.

If the check digit is wrong in the above described step ST35 and after the decode buffer 25 is cleared in a step ST43 shown in FIG. 10; if the decoded result is not the start character in the step ST37 shown in FIG. 9; if the length of the decode buffer 25 is different from the decode data length in the step ST39 shown in FIG. 10 and after the decode buffer 25 is cleared in a step ST40; and if the error character exists in the decode buffer 25 in the step 42, the process goes to a step ST44 where the CPU 23 executes the reading error process. In the reading error process, the search of the next margin or the like is executed.

If the character recognition fails, the barcode data may be formed by positioning tentatively the error character. After that, the process proceeds to the step ST45 shown in FIG. 9 where the CPU 23 determines the finish. For example, the readout finish command for the barcode symbol reading device 100 is detected, the readout control for the barcode symbol 1 is finished. If the readout finish command is not detected, the process returns to the step ST21 and the above described processes are repeated in order to continue the readout control of the barcode symbol 1.

According to the barcode symbol reading device 100 of the second embodiment, the adding range for the pattern recognition is expanded to the elements in the two characters C0 and C2 at the both sides of the target character C1. In other words, the adding range is expanded to the five elements of the space (6), the bar (5), the space (4), the bar (3) and the space (2) in the character C1 that is prior to the target character by one character and to the five elements of the bar (1), the space (2), the bar (3), the space (4) and the bar (5) in the just posterior character C2 so that the candidate characters as the decoded result can be determined from 51 kinds of the target characters.

Therefore, since the computation is applied to the portions including the elements of the two characters C0 and C2 at both sides of the target character C1, the misreading can be avoided even if many errors such as the lacks and scratches are contained at the edge portions of the target character by comparison to the conventional system that performs the pattern recognition with using only the width data in the character. Thus, the possibility of recognizing the character is improved for a case that the maximum error of the widths of the element such as the bars and the spaces is equal to or larger than $.+-.0.5$ modules. In addition, by narrowing down the target characters, the computational complexity can be reduced, the pattern recognition process time can be reduced and the high speed process of the data can be accomplished.

Embodiment 3

Figure 11:
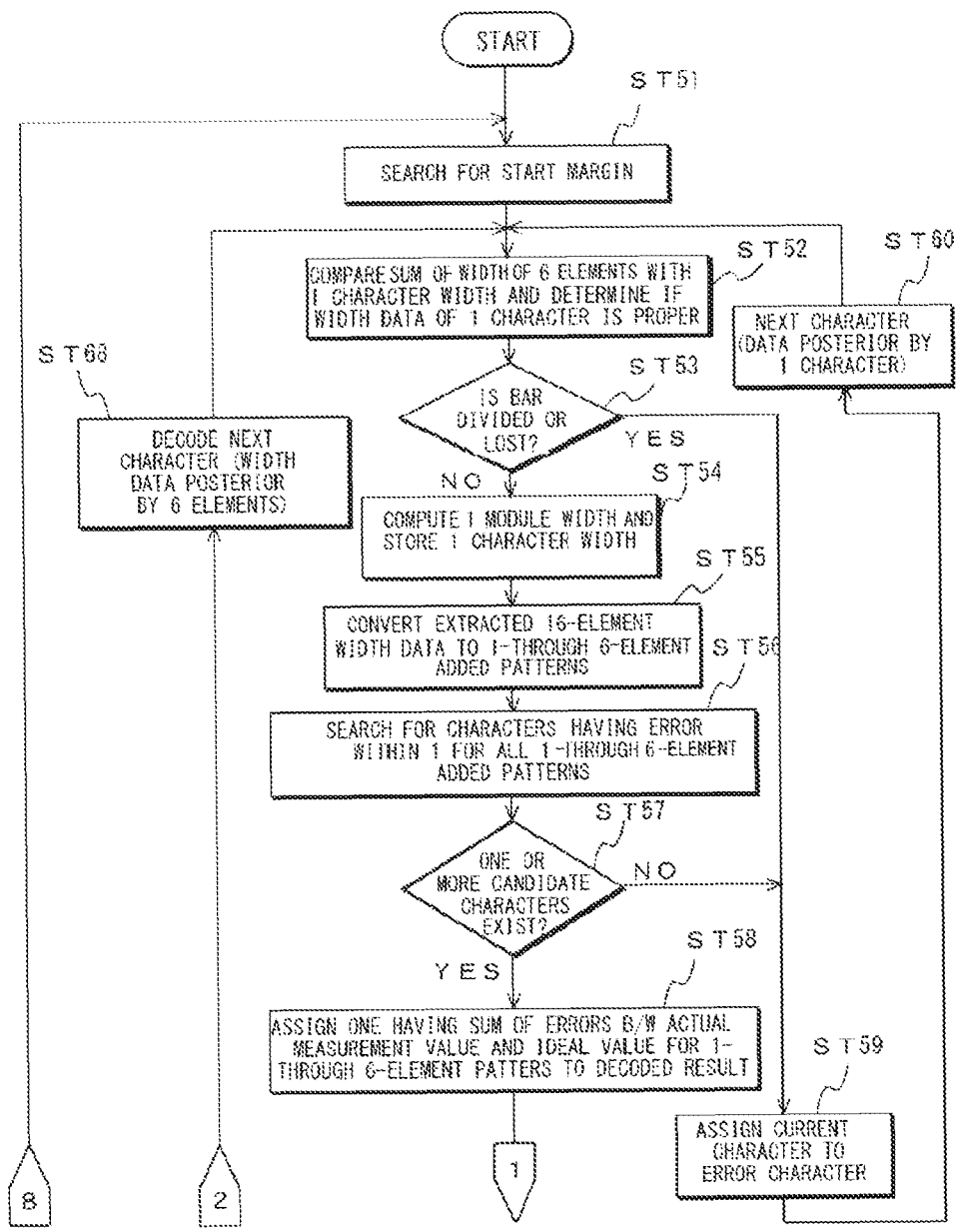
FIG. 11 is a flow chart showing a decode example (part one) of obfuscation character according to the third embodiment.

Next, examples (first through third) for decoding obfuscation characters according to the third embodiment will be explained with reference to FIG. 11 through FIG. 13. This embodiment uses the process that combines the character decode algorithm explained for the first embodiment and the multi-scanning reconstruction explained for the second embodiment. Under these decoding conditions, the start margin is searched for in a step ST51 shown in FIG. 11. At this time, the optical reading unit 2 reads the barcode symbol 1 to generate the code readout data D2, which is similar to the first embodiment. The code readout data D2 is applied from the optical reading unit 2 to the counter unit 4. The clock generation unit 3 applied the CLK signal for the sampling of the predetermined frequency to the counter unit 4.

The counter unit 4 receives the code readout data D2 from the optical reading unit 2 and the CLK signal from the clock generation unit 3, counts the code readout data D2 on the basis of the CLK signal and converts the code readout data D2 to the counted data D4 indicating the 1-element width and the 2-element added width of the elements including the white portion spaces and the black portion bars. The counted data D4 is the numerical number data train representative of each of the widths of the bars (black portions) and the widths of the spaces (white portions). The counted data D4 is stored in the width data storage unit 10. It is to be noted that the search of the start margin will not be described.

In a step ST52, the CPU 23 compares the sum of the 6-element widths with one character width and determines if the width data D10 for one character is proper or not. In this explanation, the sum of the added width of the six elements including the adjacent bars and spaces in one character is compared with the whole width value indicating the whole width of one character and the adequateness of the width data D10 for one character is determined in accordance with the comparison result.

In this example, the comparison unit 23c of the CPU 23 compares the sum of the widths W1 through W6 of the six adjacent elements of the bar (1), the space (2), the bar (3), the space (4), the bar (5) and the space (6) in one character with the whole width value indicating the whole width of one character. The adequateness of the width data D10 for one character is determined in accordance with the comparison result of the comparison unit 23c and the target characters can be narrowed down on the basis of the determination so that the computational complexity can be reduced and the high speed process can be accomplished.

In a step ST53, the CPU 23 branches the control in accordance with the existence of the divided or lost bar. When determining the existence of the divided or lost bar, the comparison result of the comparison unit 23c is used. Since the character frame can be determined from the whole width of the characters C0 and C2 before and after the target character C1, the decode operation can be continued even if the number of the elements is too much or too little because of void, spot or the like.

If there is no divided or lost bar, the CPU 23 computes the one module width and stores the one character width in a step ST54. At this time, the computation unit 23a computes the 1-module width of the target character C1 in accordance with the six kinds of the width W11 data through the width W16 data. One character width is obtained by summing the widths W1 through W6 of the six adjacent elements of the bar (1), the space (2), the bar (3), the space (4), the bar (5) and the space (6) in one character shown in FIG. 7B.

In a step ST55, the CPU 23 converts the 21 kinds of the extracted width data D10 into the 1-through 6-element added patterns (element widths). In this example, the six kinds of the width W11 data through the width W16 data are converted into 1-element data of one character and the 1-element pattern is formed as the recognized pattern of the target character C1 on the basis of the 1-element data. The five kinds of the width W21 data through the width W25 data are converted into 2-element data of one character and the 2-element added pattern (recognized pattern) of the target character C1 is formed on the basis of the 2-element added data. The four kinds of the width W31 data through the width W34 data are converted into 3-element added data of one character and the 3-element added pattern of the target character C1 is formed on the basis of the 3-element added data. The three kinds of the width W41 data through the width W43 data are converted into 4-element data of one character and the 4-element added pattern of the target character C1 is formed on the basis of the 4-element added data. The two kinds of the width W51 data through the width W52 data are converted into 5-element added data of one character and the 5-element added pattern of the target character is formed on the basis of the 5-element added data. The one kind of the width W61 data is converted into 6-element data of one character and the 6-element added pattern of the target character C1 is formed on the basis of the 6-element added data.

In a step ST56, in order to narrow down the characters, the CPU 23 searches for the characters with the error of the module number within 1 among all the 1-element pattern and the 2- though 6-element added patterns and determines the candidate characters. At this time, the extraction unit 23b of the CPU 23 extracts the candidate characters by narrowing down the target characters C1 having the module numbers that are the integers with the error within 1 for the 1-element pattern and the 2-through 6-element added patterns obtained by the computation unit 23a. In such case, the extraction unit 23b extracts the width data D10 of six elements for one character of the 1-element pattern and the 2- through 6-element added patterns and the width data D10 of (6-1) elements before and after the target character, which are obtained by the computation unit 23a.

In a step ST57, the CPU 23 branches the control in accordance with a fact if one or more candidate characters exist or not. In a case of the one or more (plural) candidate characters exist, in a step ST58, the error between the actual measurement value and the ideal value of the 1- through 6-element added patterns is computed, and the candidate character having the minimum error sum is assigned to the decoded result.

The candidate character having the minimum error value is the character having the strongest correlation to the expected value character. In this example, the target character C1 having the minimum total error can be selected as the candidate character.

At this time, in the CPU 23, the expected value character (theoretical value) is read from the expected value storage unit 24 to the comparison unit 23c of the CPU 23. The comparison unit 23 c compares each of the candidate characters having the module numbers of each of the 2- through 6-element added patterns (element widths) extracted by the extraction unit 23b with the expected value character (theoretical value) for evaluating the candidate character. The comparison result is applied to the search unit 23d.

The search unit 23d searches for the expected value character having the strongest correlation to the candidate character. For example, if the computation unit 23a computes the error between the actual measurement value of the module number of each of the candidate characters and the ideal value of the module number of the expected value character, the search unit 23d searches for the expected value character having the most strongest correlation to the candidate character having the minimum error value of the error values that are obtained by the sum of the errors computed by the computation unit 23a.

In this example, since the expected value character having the strongest correlation to the candidate character having the minimum error value, the misreading of the barcode can be prevented significantly by comparison to the conventional type barcode reading method. If no candidate characters exist in the step ST57, the current character is assigned to the error character in a step ST59. After that, the next character (data posterior by the character width) is decoded in a step ST60.

Figure 12:
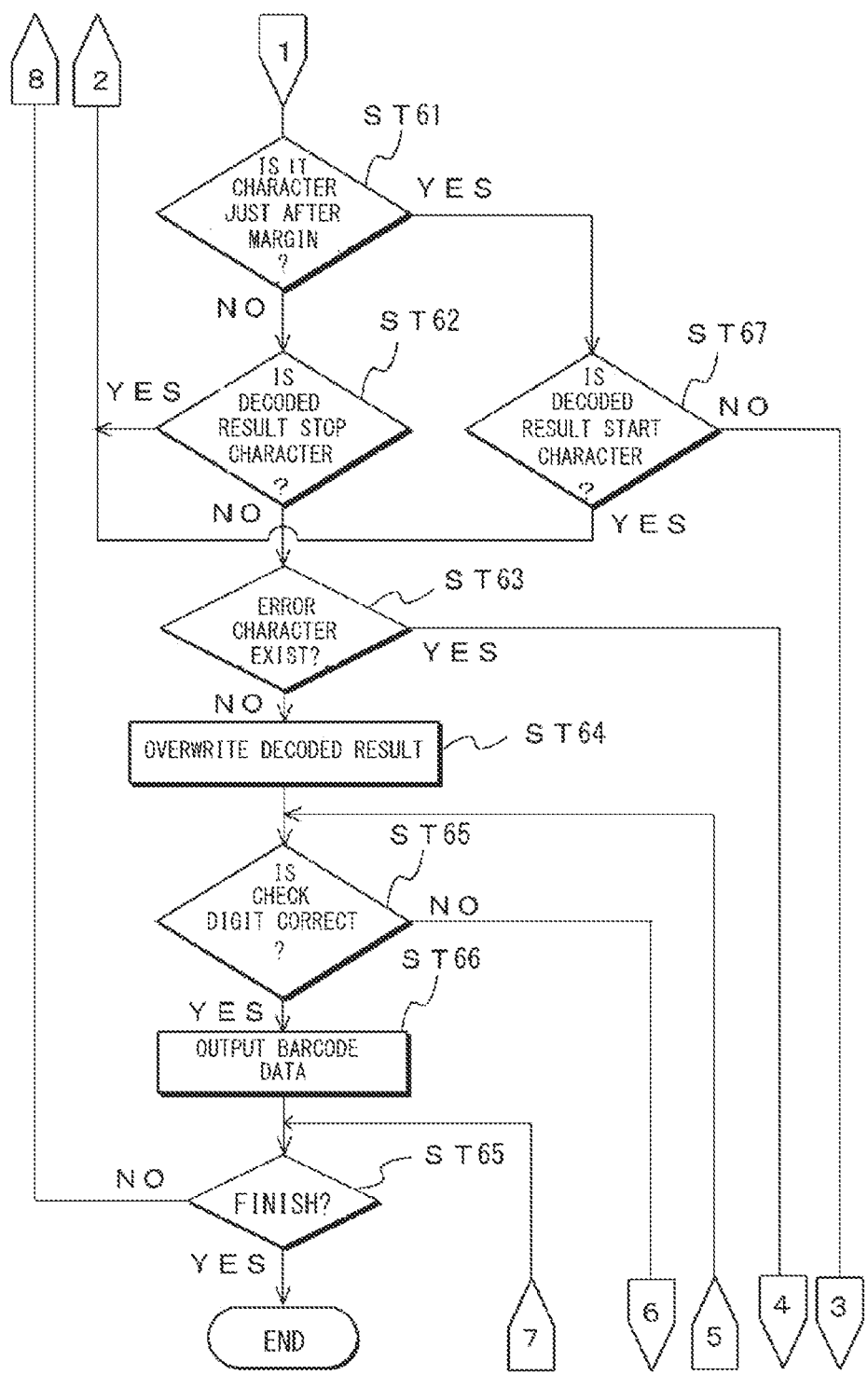
FIG. 12 is a flow chart showing the decode example (part two) of the obfuscation character.

For the candidate character assigned to the decoded result in the above described step ST58, the CPU 23 branches the control in accordance with a fact if it is the target character just after the margin or not in a step ST61 shown in FIG. 12. If the candidate character assigned to the decoded result is not the target character just after the margin, the process goes to a step ST62 where the CPU 23 branches the control in accordance with a fact if the decoded result is the stop character or not. If the decoded result is not the stop character, the process goes to a step ST63 where the CPU 23 branches the control in accordance with a fact if the error character exists or not in the decoded result.

If the error character does not exist in the decoded result, the process goes to a step ST64 where the CPU 23 overwrites the decoded result of the current scanning on the decode buffer 25. After that, the process goes to a step ST65 where the CPU 23 performs the error detection (parity check) and branches the control in accordance with a fact if the check digit is correct or not. If the check digit is correct, the CPU 23 completes the readout operation in a step ST66, applies the barcode data D12 of the decode buffer 25 and clears the decode buffer 25 (normal finish). Then, the process goes to a step ST65.

If the candidate character is the target character just after the margin in the step ST61, the process goes to a step ST67 where the CPU 23 branches the control in accordance with a fact if the decoded result is the start character or not. If the decoded result is the start character in the above-described step ST67 and if the decoded result is the stop character in the step ST62, the process goes to a step ST68. In the step ST68, the CPU 23 decodes the next character (width data D10 posterior by six elements). Then, the process returns to the step ST52.

Figure 13:
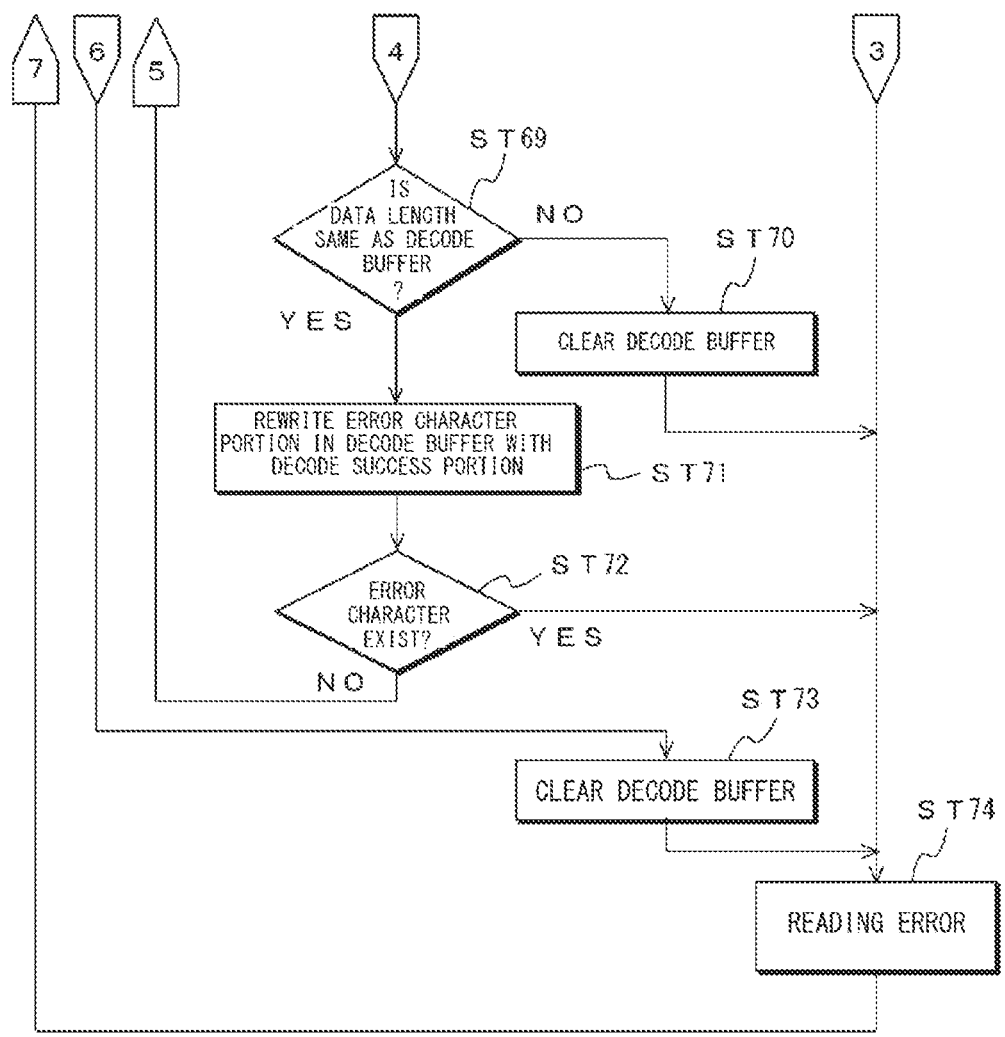
FIG. 13 is a flow chart showing the decode example (part three) of the obfuscation character.
Figure 14:
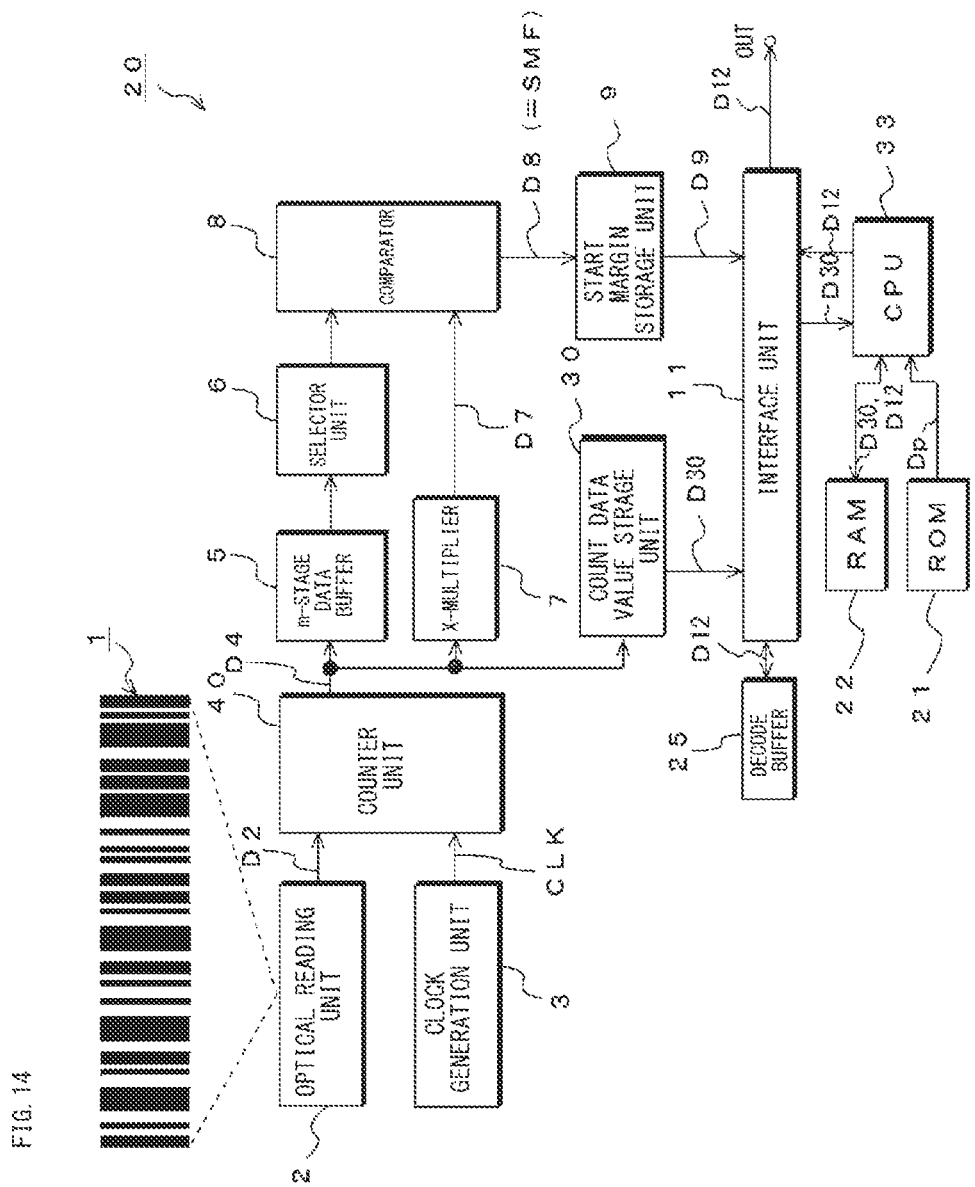
FIG. 14 is a block diagram of a configuration example of an optical reading device 20 according to a conventional example.

If there is the error character in the decoded result in the step ST63, the CPU 23 branches the control in accordance with a fact if the length of the decode buffer 25 is the same as the decode data length or not in a step 69 shown in FIG. 13. If the length of the decode buffer 25 is the same as the decode data length, the data is rewritten in a case that the error character portion in the decode buffer 25 is successfully decoded in a step ST71. After that, the process goes to a step ST72 where the control is branched in accordance with a fact if the error character exists in the decode buffer 25 or not. If the error character does not exist in the decode buffer 25, the process returns to the step ST65.

If the check digit is wrong in the above-described step ST65 and after the decode buffer 25 is cleared in the step ST73 shown in FIG. 13; if the decoded result is not the start character in the step ST67 shown in FIG. 12; if the length of the decode buffer 25 is different from the decode data length in the step ST69 shown in FIG. 13 and after the decode buffer is cleared in the step ST70; and if the error character exists in the decode buffer 25 in the step ST72, the process goes to a step ST74 where the CPU 23 executes the readout error process. In the readout error process, the next margin is searched for.

If the character recognition fails, the error character may be tentatively positioned and the barcode data may be formed. After that, the process goes to the step ST65 shown in FIG. 12 where the CPU 23 determines if the process is finished or not. For example, if the readout finish command for the barcode symbol reading device 100 is detected, the reading control for the barcode symbol 1 is finished. If the readout finish command is not detected, the process returns to the step ST51 where the above-described contents are repeated in order to continue the reading control for the barcode symbol 1.

As described hereinbefore, when reading the barcode symbol 1 and outputting its decoded result, the barcode symbol reading device 100 according to the third embodiment combines the character decode algorithm explained in the first embodiment and the multi-scanning reconstruction explained in the second embodiment. Under this condition, the search unit 23d compares each of the candidate characters having the module numbers of the 2- through 6-element added patterns extracted by the extraction unit 23b with the expected value character for evaluating the candidate characters and searches for the expected value character having the strongest correlation to the candidate character.

According to this search, the barcode data D12 of the expected value character having the strongest correlation to the candidate character extracted from the plural target characters can be outputted as the decoded result of the readout of the barcode symbol 1. Therefore, the misreading of the barcode symbol 1 can be prevented significantly by comparison to the conventional type barcode reading method.

In addition, the error range is expanded to .+−.1.0 from .+−.0.5 of the conventional type so as to increase the target characters. Since the width data D10 of six elements for one character and the width data D10 of five elements before and after the target character are extracted, more number of the candidate characters obtained by narrowing down the target characters wherein the module numbers of the 2- through 6-element added patterns are the integers with the errors equal to or less than 1 can be extracted than the conventional method. Further, by narrowing down the candidate characters, the computational complexity can be reduced, the pattern recognition process time can be reduced and the high speed process can be accomplished. Therefore, the misreading of the barcodes can be prevented significantly by comparison to the conventional type barcode reading method. By changing a threshold for setting the error range, the reliability of the width data D10 can be selected.

Although the case of the CODE 128 regarding the barcode symbol standard has been explained in the example, the present invention is not limited thereto. The present invention is can be applied similarly to respective standards, CODE 39, EAN/UPC, Interleaved 2 of 5, Code Bar, RSS, RSS Limited, RSS Expanded, etc.

INDUSTRIAL APPLICABILITY

The present invention is preferable to applied to the barcode symbol reading device that reads the barcode symbol and produces the barcode data.

DESCRIPTION OF SYMBOLS

2: optical information reading unit
3: clock generation unit
4: counter unit
5: m-stage data buffer
6: selector unit
7: x-multiplier
8: comparator
: start margin storage unit
10: width data storage unit
11: interface unit
12: microprocessor
21: ROM
22: RAM
23: CPU
23a: computation unit (computation means)
23b: extraction unit (extraction means)
23c: comparison unit
23d: search unit
24: expected value storage unit
25: decode buffer
100: barcode symbol reading device (optical information reading device).

What is claimed is:

1. An optical information reading device, comprising:
a computation means for adding widths of 2 elements through n elements, the 2 elements containing a bar and a space that are adjacent within one character, wherein n is greater than 2, the n greater than 2 elements containing two or more bars and one or more spaces and one or more bars and two or more spaces that are adjacent within one character to derive respective 2- through n-element added widths and for converting each of the 2- through n-element added widths into the module number for one character to derive an actual measurement value of the module numbers of the 2- through n-element added widths;
an extraction means for narrowing down target characters wherein each of errors between the actual measurement value and an ideal value of the module number for all the 1-element and the 2- through n-element added widths derived by said computation means is equal to or less than 1, to extract candidate characters; and
a search means for searching the one candidate character having the minimum of the summed errors as the readout decode result.

2. The optical information reading device according to claim 1 wherein said computation means adds the widths of the elements containing the bars and spaces of the characters before and after the target character when deriving each of the 2- through n-element added widths of the target character.

3. The optical information reading device according to claim 1 wherein said extraction means extracts the n element width data for one character and at least one anteroposterior width data of the target character when deriving each of the 2- through n-element added widths of the target character.

4. The optical information reading device according to claim 1 wherein said search means searches for the target character that matches either of two kinds of the target characters with respect to each of the 2- through 5-element added widths of the plural target characters obtained by the extracted means so as to narrow down the number of the candidate characters.

5. The optical information reading device according to claim 1 further comprising:
a comparison means for comparing the sum value obtained by adding the of the 2 element through n elements containing the two or more bars and the one or more spaces and the one or more bars and the two or more spaces that are adjacent within the one character with the whole width value indicating the whole width of one character and determining if the width data of one character is proper or not based on a comparison result thereof.

6. An optical information reading method, comprising:
adding of 2 elements through n elements, the 2 elements containing a bar and a space that are adjacent within one character, wherein n is greater than 2, the n greater than 2 elements containing two or more bars and one or more spaces and one or more bars and two or more spaces that are adjacent within one character to obtain respective 2- through n-element added widths;
converting each of the obtained 2- through n-element added widths into a module number with respect to one character to obtain an actual measurement value of the module number of the 2- through n-element added widths;
extracting a candidate character by narrowing down target characters wherein each of errors between the actual measurement value and an ideal value of the module number for all the 1-element and the obtained 2- through n-element added widths is equal to or less than 1, to extract candidate characters; and
searching the one candidate character having the minimum of the summed errors as the readout decode result.

7. The optical information reading method according to claim 6 wherein the adding includes adding the widths of the elements containing the character bars and the spaces of the characters before and after the target character when obtaining each of the 2- through n-element added widths of the target character.

8. The optical information reading method according to claim 7 wherein the extracting includes extracting the n-element width data of said one character and at least one anteroposterior width data of the target character when obtaining each of the 2- through n-element added widths.

9. The optical information reading method according to claim 8 further comprising searching for the target character that is coincident with either of two kinds of the target characters with respect to the 2- through n-element added widths of the plural extracted target characters and narrowing down the number of the candidate characters.

10. The optical information reading method according to claim 6 further comprising comparing the sum value of the added widths of the 2 elements through n elements containing the two or more bars and the one or more spaces and the one or more bars and the two or more spaces that are adjacent within the one character with the whole width value indicating the whole width of said one character to determine if the width data for one character is proper or not in accordance with a comparison result thereof.

11. A non-transitory computer readable recording medium storing instructions that when executed enable a computer to:
add widths of 2 elements through n elements, the 2 elements containing a bar and a space that are adjacent within one character, wherein n is greater than 2, the greater than 2 elements containing two or more bars and one or more spaces and one or more bars and two or more spaces that are adjacent within one character to obtain respective 2- through n-element added widths;
convert each of the obtained 2- through n-element added widths into a module number with respect to one character to obtain an actual measurement value of the module number of the 2- through n-element added widths;
extract a candidate character by narrowing down target characters wherein each of errors between the actual measurement value and an ideal value of the module number for all the 1-element and the obtained 2-through n-element added widths is equal to or less than 1, to extract candidate characters; and
search the one candidate character having the minimum of the summed errors as the readout decode result.

\* \* \* \* \*